US012682894B2

(12) United States Patent (10) Patent No.: US 12,682,894 B2
Kanungo et al. (45) Date of Patent: Jul. 14, 2026

(54) SYSTEM AND METHOD FOR SIMULTANEOUSLY IDENTIFYING INTENT AND SLOTS IN VOICE ASSISTANT COMMANDS

(71) Applicant: SAMSUNG ELECTRONICS CO., LTD., Suwon-si (KR)

(72) Inventors: Tapas Kanungo, Redmond, WA (US); Nehal A. Bengre, Cupertino, CA (US); Qingxiaoyang Zhu, Woodland, CA (US); Yurii Lozhnevsky, Sunnyvale, CA (US); Stephen Michael Walsh, Sunnyvale, CA (US); Dmitrii Siakov, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 692 days.

(21) Appl. No.: 17/888,146

(22) Filed: Aug. 15, 2022

(65) Prior Publication Data

US 2023/0230584 A1 Jul. 20, 2023

Related U.S. Application Data

(60) Provisional application No. 63/316,337, filed on Mar. 3, 2022, provisional application No. 63/300,511, filed on Jan. 18, 2022.

(51) Int. Cl.
*G10L 15/183* (2013.01)
(52) U.S. Cl.
CPC ................................... *G10L 15/183* (2013.01)
(58) Field of Classification Search
CPC ..................................................... G10L 15/183
See application file for complete search history.

(56) References Cited

U.S. PATENT DOCUMENTS 10,885,906 B2 1/2021 Steedman Henderson et al.
10,970,493 B1 4/2021 Lee et al.
(Continued)

FOREIGN PATENT DOCUMENTS

CN 108334496 A 7/2018
WO 2018/212941 A1 11/2018
WO 2021/190259 A1 9/2021

OTHER PUBLICATIONS

Communication issued Sep. 17, 2024 by the European Patent Office in European Patent Application No. 22922365.6.
(Continued)

*Primary Examiner* — Richemond Dorvil
*Assistant Examiner* — Ethan Daniel Kim
(74) *Attorney, Agent, or Firm* — Sughrue Mion, PLLC

(57) ABSTRACT

In an embodiment of the present disclosure, a method of simultaneously identifying intent and slots in a voice assistant command includes tokenizing, into a plurality of tokens, a current utterance of a user of a device comprising the voice assistant command, prepending the plurality of tokens with a previous utterance and a separation token, obtaining, using a transformer-based machine learning model, one or more predictions for the voice assistant command from the prepended plurality of tokens, aligning, according to one or more constraints, the at least one of the flag prediction, the goal prediction, and the sub-goal prediction, providing, to the device, the identified intent and the identified slots based on the intent prediction and the aligned at least one of the flag prediction, the goal prediction, and the sub-goal prediction, causing the device to perform the voice assistant command according to the identified intent and the identified slots.

18 Claims, 8 Drawing Sheets

(56) References Cited

U.S. PATENT DOCUMENTS

| | | | | |
|---|---|---|---|---|
| 2018/0012597 | A1 | 1/2018 | Mathias et al. | |
| 2020/0227070 | A1 | 7/2020 | Kim et al. | |
| 2020/0279002 | A1 | 9/2020 | Kim et al. | |
| 2020/0364338 | A1 * | 11/2020 | Ducau | G06N 3/084 |
| 2021/0110822 | A1 | 4/2021 | Pramanick et al. | |
| 2021/0264111 | A1 | 8/2021 | Aditya et al. | |
| 2021/0375277 | A1 * | 12/2021 | Lai | G06F 16/3329 |
| 2021/0375280 | A1 * | 12/2021 | Wang | G10L 15/063 |
| 2021/0390099 | A1 * | 12/2021 | Rahmfeld | G06F 16/26 |
| 2021/0406681 | A1 | 12/2021 | Shanbhag et al. | |
| 2022/0139384 | A1 * | 5/2022 | Wu | G06F 40/35 |
| | | | | 704/257 |

OTHER PUBLICATIONS

Weld, Henry et al., "A survey of joint intent detection and slot-filling models in natural language understanding", arXiv:2101.08091v1 [cs.CL], Jan. 20, 2021. (33 pages total).
Gupta, Arshit et al., "Simple, Fast, Accurate Intent Classification and Slot Labeling for Goal-Oriented Dialogue Systems", arXiv:1903. 08268v2 [cs.CL], Jul. 17, 2019. (10 pages total).
Arshit Gupta et al., "Simple, Fast, Accurate Intent Classification and Slot Labeling for Goal-Oriented Dialogue Systems", Proceedings of the SIGDial 2019 Conference, Sep. 2019, pp. 46-55.
International Search Report (PCT/ISA/210) and Written Opinion (PCT/ISA/237) issued by the International Searching Authority on Mar. 17, 2023 for International Patent Application No. PCT/KR2022/ 020143.

* cited by examiner

200A

200B

200C

400

800

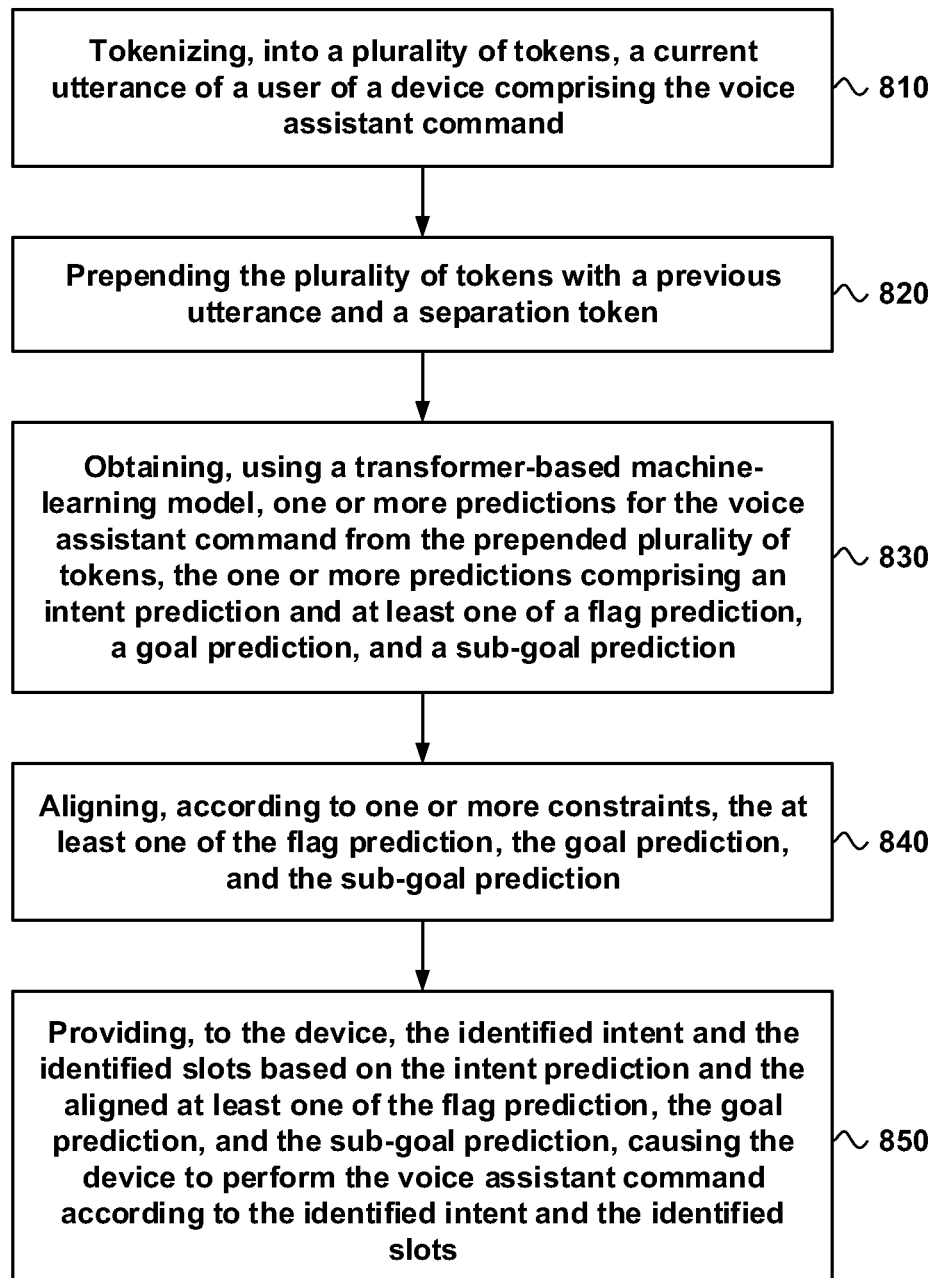

Tokenizing, into a plurality of tokens, a current utterance of a user of a device comprising the voice assistant command ~ 810

Prepending the plurality of tokens with a previous utterance and a separation token ~ 820

Obtaining, using a transformer-based machine-learning model, one or more predictions for the voice assistant command from the prepended plurality of tokens, the one or more predictions comprising an intent prediction and at least one of a flag prediction, a goal prediction, and a sub-goal prediction ~ 830

Aligning, according to one or more constraints, the at least one of the flag prediction, the goal prediction, and the sub-goal prediction ~ 840

Providing, to the device, the identified intent and the identified slots based on the intent prediction and the aligned at least one of the flag prediction, the goal prediction, and the sub-goal prediction, causing the device to perform the voice assistant command according to the identified intent and the identified slots ~ 850

FIG. 8

SYSTEM AND METHOD FOR SIMULTANEOUSLY IDENTIFYING INTENT AND SLOTS IN VOICE ASSISTANT COMMANDS

CROSS-REFERENCE TO RELATED APPLICATIONS

This application is based on and claims priority under 35 U.S.C. § 119 to U.S. Provisional Patent Application No. 63/300,511, filed on Jan. 18, 2022, and to U.S. Provisional Patent Application No. 63/316,337, filed on Mar. 3, 2022, in the U.S. Patent and Trademark Office, the disclosures of which are incorporated by reference herein in their entireties.

BACKGROUND

1. Field

The present disclosure relates generally to natural language speech processing, and more particularly to methods and apparatuses for simultaneously identifying intent and slots in a voice assistant command.

2. Description of Related Art

In related speech processing apparatuses, tasks may typically be communicated to voice assistants via a task-oriented language. The task-oriented language may include a notion of "intent" and/or "slots" when describing the task to be performed by the voice assistants. The intent may refer to a specific sub-category of tasks, and the slots may refer to specific attributes that may be needed for performing and/or completing the intent (e.g., a particular task).

In such speech processing apparatuses, intent and slot identification may be performed by a voice assistant. While related voice assistants may focus on improving identification accuracy of popular and/or common queries, accurate intent and slot identification of tail queries (e.g., less popular queries) may improve a user experience for the users of the related voice assistants. However, compared to the popular and/or common queries, the related voice assistants may perform identification of tail queries with a lower accuracy due to a variety of reasons, such as, but not limited to, a lack of data. The lower identification accuracy may lead to user dissatisfaction and/or loss of users. Therefore, improving tail query recognition may be important for user retention.

Thus, there exists a need for further improvements in tail query recognition in voice assistants. Improvements are presented herein. These improvements may also be applicable to other speech processing technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for simultaneously identifying intent and slots in a voice assistant command are disclosed by the present disclosure.

According to an aspect of the present disclosure, a method of simultaneously identifying intent and slots in a voice assistant command is provided. The method includes tokenizing, into a plurality of tokens, a current utterance of a user of a device comprising the voice assistant command. The method further includes prepending the plurality of tokens with a previous utterance and a separation token. The method further includes obtaining, using a transformer-based machine learning model, one or more predictions for the voice assistant command from the prepended plurality of tokens. The one or more predictions include an intent prediction and at least one of a flag prediction, a goal prediction, and a sub-goal prediction. The method further includes aligning, according to one or more constraints, the at least one of the flag prediction, the goal prediction, and the sub-goal prediction. The method further includes providing, to the device, the identified intent and the identified slots based on the intent prediction and the aligned at least one of the flag prediction, the goal prediction, and the sub-goal prediction, causing the device to perform the voice assistant command according to the identified intent and the identified slots.

In some embodiments, the obtaining of the one or more predictions for the voice assistant command includes obtaining, according to an intent loss function, one or more intent predictions from an intent classifier of the transformer-based machine learning model. The obtaining of the one or more predictions for the voice assistant command further includes obtaining, according to a flag loss function, one or more flag predictions from a flag classifier of the transformer-based machine learning model. The obtaining of the one or more predictions for the voice assistant command further includes obtaining, according to a goal loss function, one or more goal predictions from a goal classifier of the transformer-based machine learning model. The obtaining of the one or more predictions for the voice assistant command further includes obtaining, according to a sub-goal loss function, one or more sub-goal predictions from a sub-goal classifier transformer-based machine learning model. The obtaining of the one or more predictions for the voice assistant command further includes optimizing an overall loss function of the transformer-based machine learning model, according to the intent loss function, the flag loss function, the goal loss function, and the sub-goal loss function. The intent loss function, the flag loss function, the goal loss function, and the sub-goal loss function are simultaneously considered when optimizing the overall loss function. The obtaining of the one or more predictions for the voice assistant command further includes determining the one or more predictions that optimize the overall loss function.

In some embodiments, the optimizing of the overall loss function includes optimizing the overall loss function at a sentence level.

In some embodiments, the optimizing of the overall loss function includes optimizing the overall loss function at a token level.

In some embodiments, the sub-goal prediction includes a plurality of sub-goal predictions. In such embodiments, the aligning of the sub-goal prediction includes, for each sub-goal prediction of the plurality of sub-goal predictions, aligning a left boundary of that sub-goal prediction with a left boundary of a corresponding slot, and aligning a right boundary of that sub-goal prediction with a right boundary of the corresponding slot.

In some embodiments, the one or more constraints comprise an intent compatibility constraint. In such embodiments, the aligning of the at least one of the flag prediction, the goal prediction, and the sub-goal prediction includes determining, according to the intent compatibility constraint, whether the intent prediction is compatible with the at least one of the flag prediction, the goal prediction, and the sub-goal prediction.

In some embodiments, the one or more constraints include a goal order constraint. In such embodiments, the aligning of the at least one of the flag prediction, the goal prediction, and the sub-goal prediction includes reordering, according to the goal order constraint, the at least one of the flag prediction, the goal prediction, and the sub-goal prediction.

In some embodiments, the method further includes obtaining one or more types of context information. In such embodiments, the method further includes creating one or more embedding spaces corresponding to each type of the one or more types of context information. Each embedding space of the one or more embedding spaces has a same dimension as the plurality of tokens. In such embodiments, the obtaining of the one or more predictions for the voice assistant command includes obtaining, using the transformer-based machine learning model, the one or more predictions for the voice assistant command from the prepended plurality of tokens and the one or more embedding spaces.

In some embodiments, the one or more types of context information include at least one of a capsule-specific vocabulary, segment information, position information, regular expression-based information, part-of-speech (POS) information, user-specific knowledge information, and knowledge graph information.

In some embodiments, the method further includes categorizing, using an N-gram construction, a user utterance into a plurality of word sequences. In such embodiments, the method further includes searching each word sequence of the plurality of word sequences in a dictionary to obtain a word-level hit map. In such embodiments, the method further includes expanding, using a tokenizer, the word-level hit map into a token-level hit map. In such embodiments, the method further includes applying the token-level hit map to a feature matrix to obtain the capsule-specific vocabulary.

In some embodiments, the voice assistant command is in a natural language of the user.

In some embodiments, the method further includes reducing, using a distillation process, a size of the transformer-based machine learning model. The size of the transformer-based machine learning model corresponds to a number of layers of the transformer-based machine learning model.

According to an aspect of the present disclosure, an apparatus for simultaneously identifying intent and slots in a voice assistant command is provided. The apparatus includes a memory storage storing computer-executable instructions, and a processor communicatively coupled to the memory storage. The processor is configured to execute the computer-executable instructions and cause the apparatus to tokenize, into a plurality of tokens, a current utterance of a user of a device comprising the voice assistant command. The processor is configured to execute further computer-executable instructions and further cause the apparatus to prepend the plurality of tokens with a previous utterance and a separation token. The processor is configured to execute further computer-executable instructions and further cause the apparatus to obtain, using a transformer-based machine learning model, one or more predictions for the voice assistant command from the prepended plurality of tokens. The one or more predictions include an intent prediction and at least one of a flag prediction, a goal prediction, and a sub-goal prediction. The processor is configured to execute further computer-executable instructions and further cause the apparatus to align, according to one or more constraints, the at least one of the flag prediction, the goal prediction, and the sub-goal prediction. The processor is configured to execute further computer-executable instructions and further cause the apparatus to provide, to the device, the identified intent and the identified slots based on the intent prediction and the aligned at least one of the flag prediction, the goal prediction, and the sub-goal prediction, causing the device to perform the voice assistant command according to the identified intent and the identified slots.

In some embodiments, the computer-executable instructions to obtain the one or more predictions for the voice assistant command further cause the apparatus to obtain, according to an intent loss function, one or more intent predictions from an intent classifier of the transformer-based machine learning model. In such embodiments, the computer-executable instructions further cause the apparatus to obtain, according to a flag loss function, one or more flag predictions from a flag classifier of the transformer-based machine learning model. In such embodiments, the computer-executable instructions further cause the apparatus to obtain, according to a goal loss function, one or more goal predictions from a goal classifier of the transformer-based machine learning model. In such embodiments, the computer-executable instructions further cause the apparatus to obtain, according to a sub-goal loss function, one or more sub-goal predictions from a sub-goal classifier transformer-based machine learning model. In such embodiments, the computer-executable instructions further cause the apparatus to optimize an overall loss function of the transformer-based machine learning model, according to the intent loss function, the flag loss function, the goal loss function, and the sub-goal loss function. The intent loss function, the flag loss function, the goal loss function, and the sub-goal loss function are simultaneously considered when optimizing the overall loss function. In such embodiments, the computer-executable instructions further cause the apparatus to determine the one or more predictions that optimize the overall loss function.

In some embodiments, the sub-goal prediction includes a plurality of sub-goal predictions. In such embodiments, the computer-executable instructions to align the sub-goal prediction further cause the apparatus, for each sub-goal prediction of the plurality of sub-goal predictions, to align a left boundary of that sub-goal prediction with a left boundary of a corresponding slot, and to align a right boundary of that sub-goal prediction with a right boundary of the corresponding slot.

In some embodiments, the computer-executable instructions further cause the apparatus to obtain one or more types of context information. In such embodiments, the computer-executable instructions further cause the apparatus to create one or more embedding spaces corresponding to each type of the one or more types of context information. Each embedding space of the one or more embedding spaces has a same dimension as the plurality of tokens. In such embodiments, the computer-executable instructions to obtain the one or more predictions for the voice assistant command further cause the apparatus to obtain, using the transformer-based machine learning model, the one or more predictions for the voice assistant command from the prepended plurality of tokens and the one or more embedding spaces.

In some embodiments, the one or more types of context information comprise at least one of a capsule-specific vocabulary, segment information, position information, regular expression-based information, POS information, user-specific knowledge information, and knowledge graph information. In such embodiments, the computer-executable instructions further cause the apparatus to categorize, using an N-gram construction, a user utterance into a plurality of word sequences. In such embodiments, the computer-executable instructions further cause the apparatus to search each word sequence of the plurality of word sequences in a dictionary to obtain a word-level hit map. In such embodiments, the computer-executable instructions further cause the apparatus to expand, using a tokenizer, the word-level hit map into a token-level hit map. In such embodiments, the computer-executable instructions further cause the apparatus to apply the token-level hit map to a feature matrix to obtain the capsule-specific vocabulary.

In some embodiments, the computer-executable instructions further cause the apparatus to reducing, using a distillation process, a size of the transformer-based machine learning model, the size of the transformer-based machine learning model corresponding to a number of layers of the transformer-based machine learning model.

According to an aspect of the present disclosure, a non-transitory computer-readable storage medium storing computer-executable instructions for simultaneously identifying intent and slots in a voice assistant command by an electronic device is provided. The computer-executable instructions are configured, when executed by one or more processors of the electronic device, to cause the electronic device to tokenize, into a plurality of tokens, a current utterance of a user of a device comprising the voice assistant command. The computer-executable instructions are further configured to further cause the electronic device to prepend the plurality of tokens with a previous utterance and a separation token. The computer-executable instructions are further configured to further cause the electronic device to obtain, using a transformer-based machine learning model, one or more predictions for the voice assistant command from the prepended plurality of tokens. The one or more predictions include an intent prediction and at least one of a flag prediction, a goal prediction, and a sub-goal prediction. The computer-executable instructions are further configured to further cause the electronic device to align, according to one or more constraints, the at least one of the flag prediction, the goal prediction, and the sub-goal prediction. The computer-executable instructions are further configured to further cause the electronic device to provide, to the device, the identified intent and the identified slots based on the intent prediction and the aligned at least one of the flag prediction, the goal prediction, and the sub-goal prediction, causing the device to perform the voice assistant command according to the identified intent and the identified slots.

In some embodiments, the computer-executable instructions to obtain the one or more predictions for the voice assistant command further cause the electronic device to obtain, according to an intent loss function, one or more intent predictions from an intent classifier of the transformer-based machine learning model. In such embodiments, the computer-executable instructions further cause the electronic device to obtain, according to a flag loss function, one or more flag predictions from a flag classifier of the transformer-based machine learning model. In such embodiments, the computer-executable instructions further cause the electronic device to obtain, according to a goal loss function, one or more goal predictions from a goal classifier of the transformer-based machine learning model. In such embodiments, the computer-executable instructions further cause the electronic device to obtain, according to a sub-goal loss function, one or more sub-goal predictions from a sub-goal classifier transformer-based machine learning model. In such embodiments, the computer-executable instructions further cause the electronic device to optimize an overall loss function of the transformer-based machine learning model, according to the intent loss function, the flag loss function, the goal loss function, and the sub-goal loss function. The intent loss function, the flag loss function, the goal loss function, and the sub-goal loss function are simultaneously considered when optimizing the overall loss function. In such embodiments, the computer-executable instructions further cause the electronic device to determine the one or more predictions that optimize the overall loss function.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 illustrates a flowchart of an example method of simultaneously identifying intent and slots in a voice assistant command, according to one or more example embodiments.

DETAILED DESCRIPTION

Figure 1:
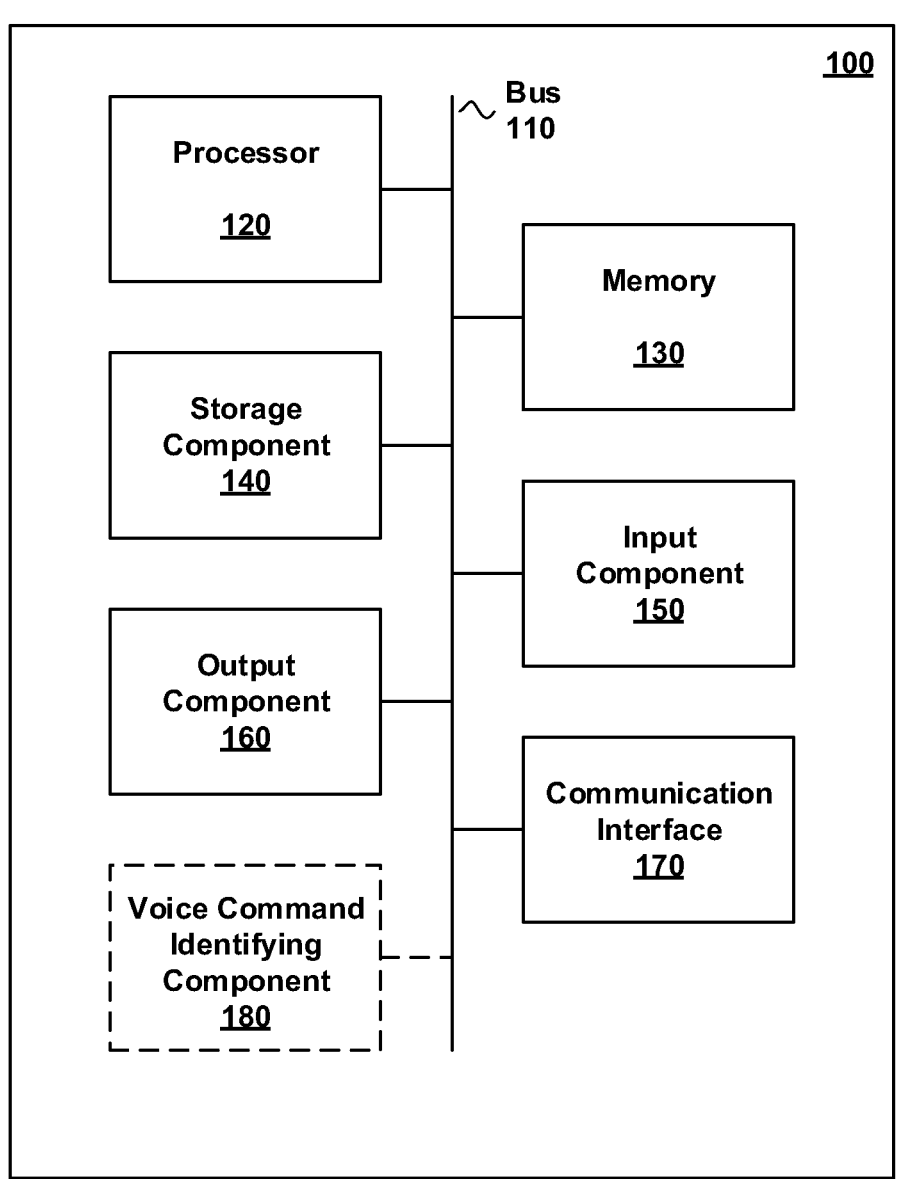
FIG. 1 depicts an example of a device that may be used in implementing one or more aspects of the disclosure, according to one or more example embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

As a general introduction to the subject matter described in more detail below, aspects described herein are directed towards systems, devices, and methods for simultaneously identifying intent and slots in a voice assistant command. Aspects described herein may be used to create a model, based on a deep-learned transformer-based machine learning algorithm, for identification of intent, flags, goals, and nested goals from a user utterance using uniform weighted metrics that may have an improved accuracy on tail queries when compared to related voice assistants. In some aspects, the identification may use customized contexts that may change in real-time.

Related voice assistants may employ one or more speech processing techniques to identify voice commands uttered by a user. That is, the related voice assistants may identify voice commands spoken by the user when the user wishes the voice assistant to perform a task. Typically, these voice commands may be communicated to the related voice assistants using a task-oriented language comprising an intent (e.g., a task to be performed) and/or slots that may provide attributes (e.g., flags, goals, and nested goals) that may be needed to perform and/or complete the task.

While the related voice assistants may identify common voice commands and/or queries with a high degree of accuracy, the identification accuracy for tail queries (e.g., less popular queries) may typically be lower. These voice assistants may perform identification of tail queries with a lower accuracy due to a variety of reasons, such as, but not limited to, a lack of data. As a result, users of these voice assistants may need to repeat tail queries until the tail queries are properly identified, and/or these voice assistants may perform an incorrect (e.g., undesired) task when a tail query is incorrectly identified. As such, failure to accurately identify these tail queries may lead to user dissatisfaction and/or loss of users.

Aspects presented herein provide for multiple manners for simultaneously identifying intent and slots in a voice assistant command. The simultaneous identification of intent and slots may comprise prepending a plurality of tokens of a current utterance of a user with a previous utterance and a separation token, and obtaining, using a transformer-based machine learning model, one or more predictions for the voice assistant command from the prepended plurality of tokens. Accuracy may be further improved by aligning, according to one or more constraints, the at least one of the flag prediction, the goal prediction, and the sub-goal prediction. Furthermore, the transformer-based machine learning model may be reduced using distilled transformer models that may allow for faster training times and a lower memory usage when compared to a related machine learning model.

As noted above, certain embodiments are discussed herein that relate to identifying intent and slots in a voice assistant command. Before discussing these concepts in greater detail, however, an example of a computing device that may be used in implementing and/or otherwise providing various aspects of the disclosure will first be discussed with respect to FIG. 1.

FIG. 1 depicts an example of a device 100 that may be used in implementing one or more aspects of the disclosure in accordance with one or more illustrative aspects discussed herein. For example, device 100 may, in some instances, implement one or more aspects of the disclosure by reading and/or executing instructions and performing one or more actions accordingly. In one or more arrangements, device 100 may represent, be incorporated into, and/or comprise a desktop computer, a computer server, a mobile device (e.g., a laptop computer, a tablet computer, a smart phone, any other type of mobile computing device, etc.), and/or any other type of data processing device.

For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, the device 100 may comprise a set of components, such as a processor 120, a memory 130, a storage component 140, an input component 150, an output component 160, a communication interface 170, and an voice command identifying component 180. The set of components of the device 100 may be communicatively coupled via a bus 110.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170, the voice command identifying component 180).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may comprise a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may comprise one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may comprise a sensor for sensing information (e.g., a global positioning system (GPS) component, an accelerometer, a gyroscope, an actuator, and the like).

The output component 160 of device 100 may comprise one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may comprise a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may comprise an Ethernet interface, an optical interface, a coaxial interface, an infrared interface, a radio frequency (RF) interface, or the like.

In some embodiments, the device 100 may comprise the voice command identifying component 180 configured to simultaneously identify intent and slots in a voice assistant command. The voice command identifying component 180 may be configured to tokenize, into a plurality of tokens, a current utterance of a user of a device comprising the voice assistant command. The voice command identifying component 180 may be further configured to prepend the plurality of tokens with a previous utterance and a separation token. The voice command identifying component 180 may be further configured to obtain, using a transformer-based machine learning model, one or more predictions for the voice assistant command from the prepended plurality of tokens. The voice command identifying component 180 may be further configured to align, according to one or more constraints, the at least one of the flag prediction, the goal prediction, and the sub-goal prediction. The voice command identifying component 180 may be further configured to provide, to the device, the identified intent and the identified slots based on the intent prediction and the aligned at least one of the flag prediction, the goal prediction, and the sub-goal prediction.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may comprise memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Having discussed an example of a device that may be used in providing and/or implementing various aspects of the disclosure, a number of embodiments will now be discussed in greater detail. In particular, and as introduced above, some aspects of the disclosure generally relate to simultaneously identifying intent and slots in a voice assistant command. In the description below, various examples illustrating how simultaneous identification of intent and slots in a voice assistant command may be provided in accordance with one or more embodiments will be discussed.

Related voice assistants, such as, but not limited to, SAMSUNG BIXBY, AMAZON ALEXA, APPLE SIRI, and GOOGLE ASSISTANT, may need to identify a voice command or task uttered by a user (e.g., "call mom"). That is, the related voice assistants may need to identify an intent and/or slots comprised in the voice command. For example and not by way of limitation, in a user utterance of "call mom", the word "call" may be identified as the intent and the word "mom" may be identified as a slot (e.g., a goal). In another example, in a user utterance of "what is the weather in San Jose", the intent may be identified as "what is the weather in" and "San Jose" may be identified as a slot and/or goal.

Typically, for common voice commands, such as, but not limited to, the examples described above, related voice assistants may be able to identify the intent and/or slots with a relatively high degree of accuracy. In some embodiments, the common voice commands, which may be referred to as head queries, may be uttered frequently, and, as such, the related voice assistants may be designed to accurately identify these head queries. However, uncommon voice commands (or tail queries), such as, but not limited to, a command with a rarely used slot (e.g., a city name that is not frequently used) and/or a rarely used command, may not be interpreted by the related voice assistants with the same relatively high degree of accuracy. That is, the related voice assistants may misidentify the intent and/or the slots of the tail queries more frequently than for head queries, resulting in a lower identification accuracy for the tail queries, when compared to the head queries. A lower identification accuracy of the tail queries may lead to users becoming dissatisfied with the related voice assistants and/or to the users discontinuing use of the related voice assistants. Thus, a voice assistant that is capable of identifying both the head queries (e.g., common, highly frequent) and the tail queries (e.g., uncommon, infrequent) with the same relatively high degree of accuracy may be desired. Such a voice assistant may result with a high user satisfaction level and with users that may be confident that the voice assistant may accurately perform their voice commands.

In some embodiments, intent may refer to the command/ task and/or command category to be performed by the voice assistant that is encapsulated in the user utterance (e.g., "[phone] call," and "what is the weather in"). A flag may refer to a slot that directly modify the intent. For example and not by way of limitation, in a user utterance "call on speaker," the "on speaker" may be identified as a flag since the phrase "on speaker" indicates that the call needs to be made on the speaker phone, for example, rather than another device.

Alternatively or additionally, a goal and/or slot may refer to one or more parameters/attributes that may be needed to perform and/or complete the task. For example, in a user utterance of "call mom," the "mom" may be identified as a goal. Nested goals, which may also be referred to as sub-goals, may refer to hierarchical groupings of related goals that may have been grouped according to at least one set of grouping criteria. For example, in a user utterance of "the recipe requires milk, sugar, and butter," "milk", "sugar," and "butter" may be identified as goals of type food, but together the three food goals may be identified as a single ingredient sub-goal. That is, the user utterance may be identified as having an ingredient sub-goal that encompasses the three food goals (i.e., milk, sugar, butter). Thus, the voice assistant may be configured to, in addition to identifying goals comprised by the user utterance, group the identified goals into hierarchical groupings of sub-goals (or nested goals) that have been grouped together according to at least one set of grouping criteria. For example and not by way of limitation, the grouping criteria may comprise criteria for grouping goals of type food into ingredient sub-goals, and the like. The present disclosure is not limited in this regard.

In some embodiments, the voice assistant may not be required to use the individually identified goals, and, instead, may use the sub-goals to perform the intended task. For example, the voice assistant may not be required to use the identified milk, sugar, and butter goals, and, instead, may use the identified ingredients sub-goal.

Figure 2A:
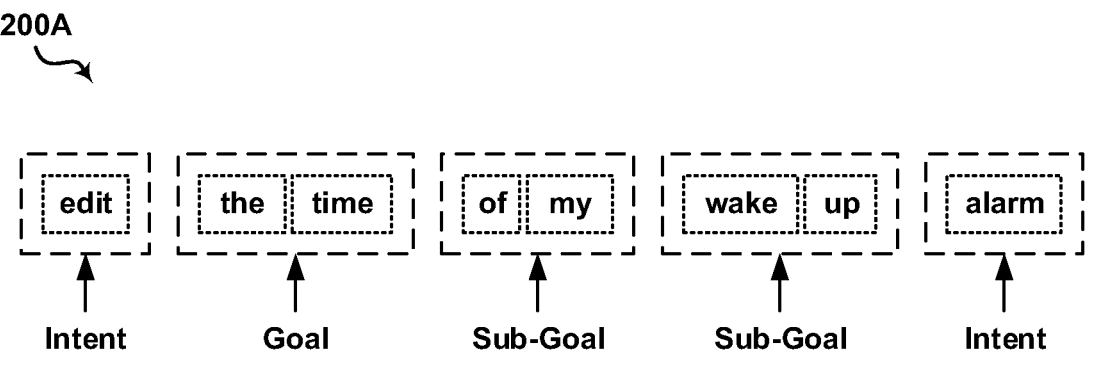
FIGS. 2A-2C illustrate a first example, a second example, and a third example, respectively, of a voice command uttered by a user and an identification of the intent and the slots of the voice command, according to one or more example embodiments.
Figure 2B:
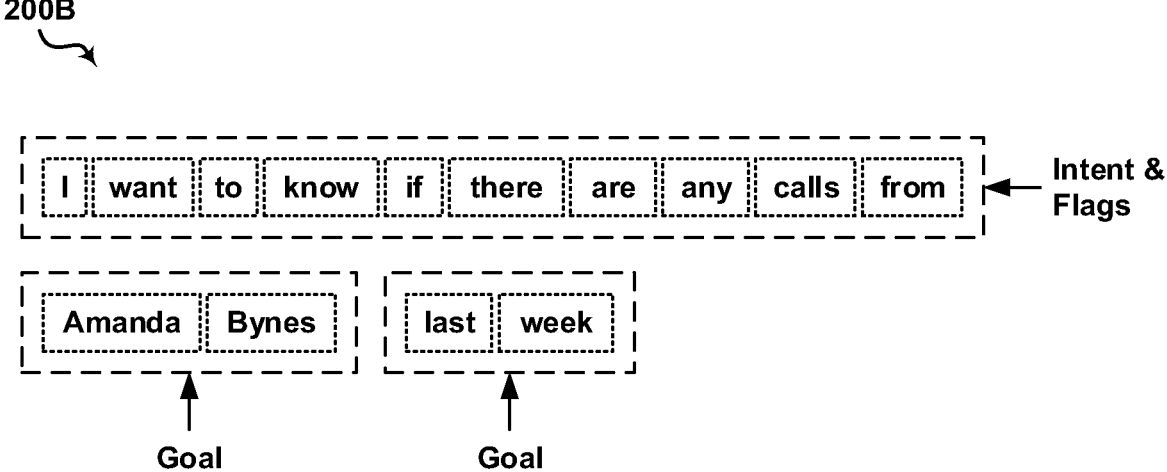
Figure 2C:
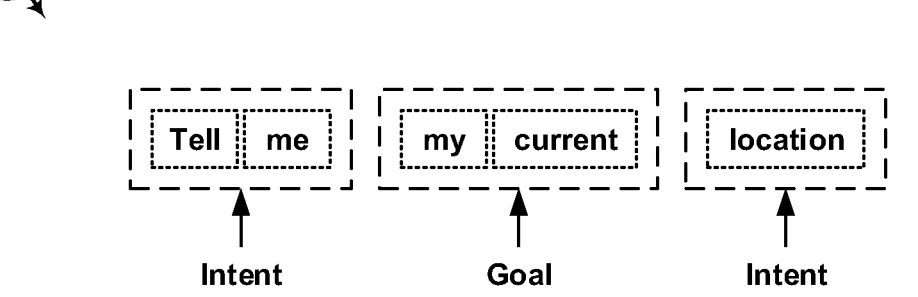

FIGS. 2A-2C illustrate a first example, a second example, and a third example, respectively, of a voice command uttered by a user and an identification of the intent and the slots of the voice command, according to one or more example embodiments. In some embodiments, at least a portion of the identification of the intent and the slots of each voice command may be implemented by the device 100 of FIG. 1. Alternatively or additionally, another computing device (e.g., server, laptop, smartphone, base station, UE, etc.) that comprises the voice command identifying component 180 of FIG. 1 may implement at least a portion of the identification of the intent and the slots of each voice command.

In some embodiments, the voice assistant command may be in a natural language of the user.

As shown in FIG. 2A, the first example 200A of a voice command may comprise "edit the time of my wake up alarm." In such an example, a voice assistant may identify "edit" and "alarm" as the intent, "the time" as a goal, and "of my" and "wake up" as sub-goals. As shown in FIG. 2B, the second example 200B of a voice command may comprise "I want to know if there are any calls from Amanda Bynes last week." In such an example, the voice assistant may identify "I want to know if there are any calls from" as the intent and the flags, and "Amanda Bynes" and "last week" as the goals. As shown in FIG. 2C, the third example 200C of a voice command may comprise "Tell me my current location." In such an example, the voice assistant may identify "Tell me" and "location" as the intent, and "my current" as the goal.

Related voice assistants may identify the intent, flags, goals, and sub-goals encompassed by voice commands in a sequential manner. For example, the related voice assistants may first identify an intent from the user utterance. Once the intent has been identified, the related voice assistants may identify flags from the user utterance, followed by identifying goals, and then identifying sub-goals from the user utterance. Such an approach may cause identification errors to propagate downstream through the identification sequence. For example, an erroneous identification of the intent may cause all subsequent identifications (e.g., flags, goals, nested goals) to also be erroneous.

Identification errors that may affect the accuracy of a voice assistant may be classified into at least two categories. A first category may comprise misidentification of the intent and/or slot. For example, the identified intent and/or slot may not match the corresponding intent and/or slot comprised by the user utterance. A second category may comprise misidentification of the location and/or span of a slot. That is, the second category may comprise misidentification of a starting position and/or an ending position of the slot within the user utterance. For example, a slot comprising a city name comprising multiple words (e.g., "San Francisco") may need to be accurately identified as having a starting position at the first letter of the first word of the city name and having an ending position at the last letter of the last word of the city name. In such an example, identification of the city name slot as comprising only "San" or only "Francisco" results in an error. For another example, a slot comprising a full name of a person may typically comprise multiple words (e.g., "Leonardo di ser Piero da Vinci") and accurate identification of the location and span of such a full name slot requires identification of every word in the full name of the person.

In some embodiments, an inference time may refer to a runtime latency of the voice assistant. That is, the inference time may refer to a processing time of the voice assistant to identify a voice command uttered by a user. A low inference time (or runtime latency) of approximately 15 to 20 milliseconds (msec) may be required in order for the voice assistant to perform the requested task and/or provide a response to the user in a timely manner.

In some embodiments, a training time may refer to time span required to train the voice assistant to identify voice commands at an acceptable accuracy level. Typically, training times of related voice assistants may not be considered as a design limitation. As a result, the training times of the related voice assistants may have significant lengths in the order of several hours, days, and/or weeks.

Figure 3:
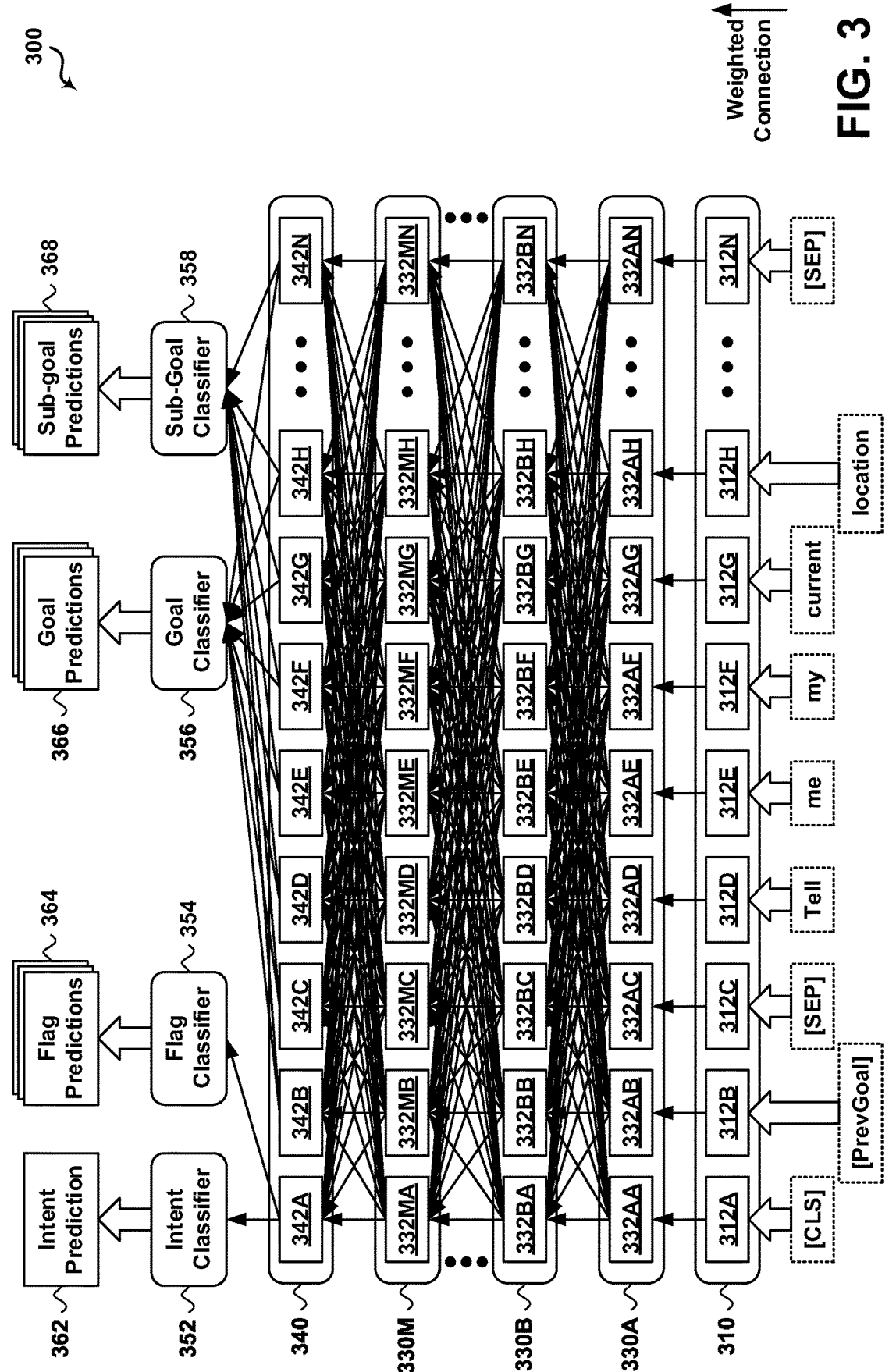
FIG. 3 illustrates an example architecture of a deep-learning-based machine learning model for simultaneously identifying intent and slots in a voice assistant command, according to one or more example embodiments.

Advantageously, according to aspects of the present disclosure, the voice assistant may use a deep-learning-based (e.g., transformer-based) machine learning model, as described in further detail in reference to FIG. 3, that may simultaneously identify the elements of the voice commands (e.g., intent, flags, goals, sub-goals) that optimize an overall loss function of the machine learning model. Alternatively or additionally, the voice assistant may further improve identification accuracy by performing the simultaneous identification using customized context information without the need for retraining the machine learning model. In some embodiments, the customized context information may comprise information that may change frequently (e.g., lists of network device names, lists of contacts, and the like).

Figure 6:
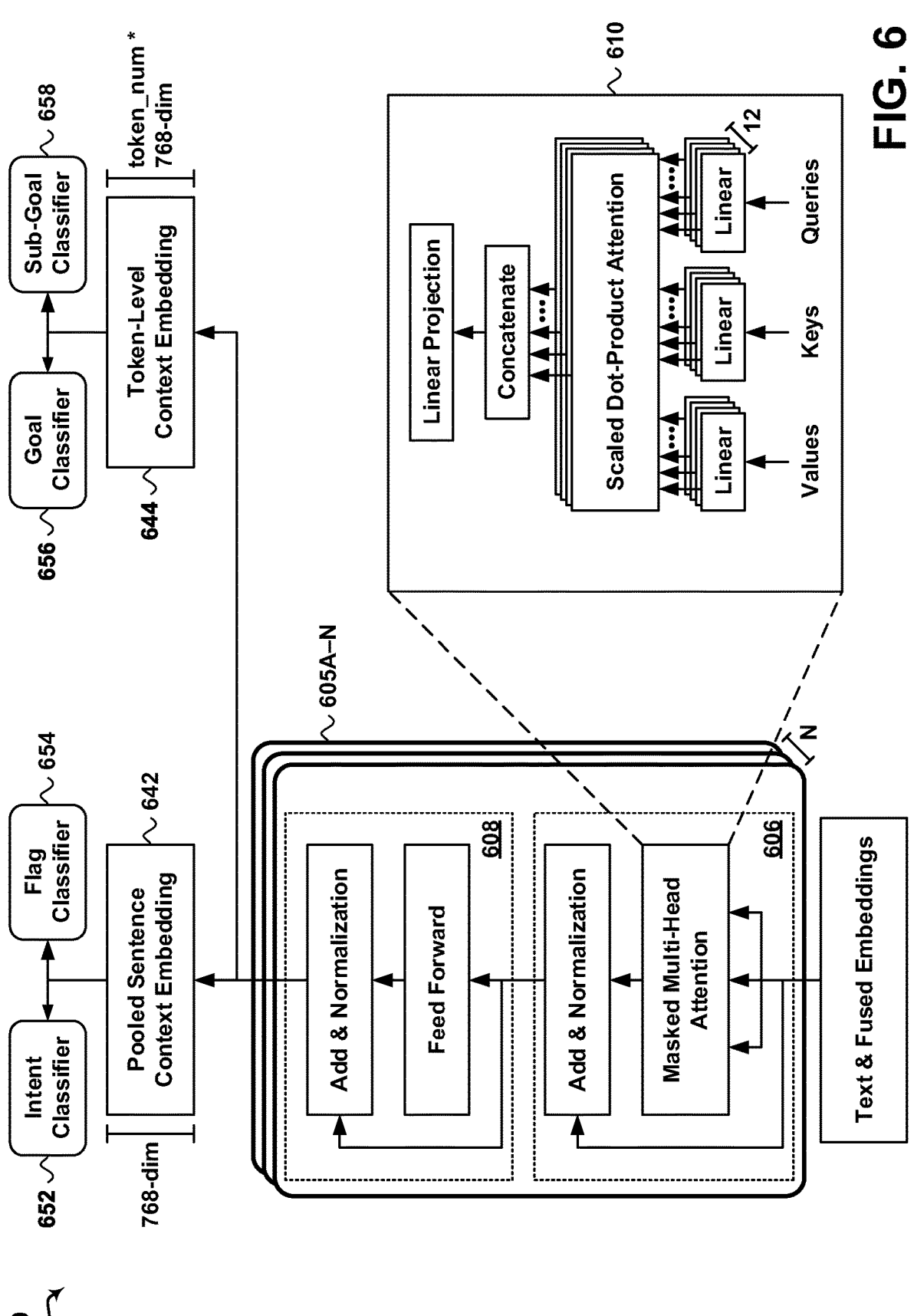
FIG. 6 depicts an example architecture of a machine learning model having a reduced model size, according to one or more example embodiments.

In some embodiments, as described in further detail in reference to FIG. 6, the size of the machine learning model may be reduced using distillation techniques that may result in improved training times and reduced processing footprints (e.g., inference time, memory usage, and the like). As a result, developers (e.g., gazetteers) may create capsules comprising customized versions of the machine learning model, according to some aspects of the present disclosure, in a timely manner. For example, a capsule may comprise information for identifying and responding to a set of queries and/or tasks that may be related to a particular subject (e.g., weather, time, and the like). Once the developers have trained the capsule, the capsule may be deployed to an inference server (e.g., production server) to be used by voice assistants to identify and respond to queries and/or tasks related to the subject of the capsule.

FIG. 3 illustrates an example architecture of a deep-learning-based machine learning model for simultaneously identifying intent and slots in a voice assistant command, according to one or more example embodiments. Referring to FIG. 3, a machine learning model 300 that implements one or more aspects of the disclosure is illustrated. In some embodiments, at least a portion of the machine learning model 300 may be implemented by the device 100 of FIG. 1. Alternatively or additionally, another computing device (e.g., server, laptop, smartphone, base station, UE, etc.) that comprises the voice command identifying component 180 may implement at least a portion of the machine learning model 300.

In some embodiments, the machine learning model 300 may comprise a transformer-based machine learning model, such as, but not limited to, bi-directional encoder representations from transformers (BERT), generative pre-trained transformer 2 (GPT-2), and the like.

In some embodiments, the machine learning model 300 may be trained on a training environment (not shown) comprising one or more computing devices, such as, but not limited to, a desktop computer, a computer server, a mobile device (e.g., a laptop computer, a tablet computer, a smart phone, any other type of mobile computing device, etc.), and/or any other type of data processing device. The machine learning model 300 may be trained using a significantly large corpus, such as, but not limited to an open-source corpus like Wikipedia, in order to benefit from the transfer learning features provided by the transformer-based machine learning model. As shown in FIG. 3, the machine learning model 300 may be configured to comprise separate heads (e.g., objective functions) for each of the identification tasks (i.e., intent, flags, goals, and nested goals), namely, an intent classifier 352, a flag classifier 354, a goal classifier 356, and a sub-goal classifier 358.

The machine learning model 300 may be deployed to an inference server (e.g., a production server) at the completion of the training (not shown). The inference server may comprise one or more computing devices as described above. For example, the inference server may comprise the device 100 of FIG. 1. Alternatively or additionally, the inference server may comprise one or more computing devices comprising the voice command identifying component 180.

In some embodiments, the inference server may be communicatively coupled to a voice assistant device via a network (not shown). The network may comprise at least one of a LAN, a WAN, a MAN, a private network, an ad hoc network, an intranet, the Internet, a fiber optic-based network, a cellular network (e.g., a 5G network, an LTE network, a 3G network, a CDMA network, and the like), a PLMN, a telephone network (e.g., PSTN), or the like, and/or a combination of these or other types of networks. Alternatively or additionally, the inference server and the voice assistant device may be another device communicatively coupled via a D2D communication link, such as, but not limited to, FlashLinQ, WiMedia, Bluetooth, ZigBee, Wi-Fi, LTE, 5G, and the like.

In some embodiments, the voice assistant device may receive user utterances and provide the user utterances to the inference server. For example, the user utterances may be transcribed into text and tokenized into a plurality of input tokens. The plurality of input tokens may be provided to the machine learning model 300 for identification of intent and/or slots comprised by the user utterances.

The machine learning model 300 may comprise an embedding layer 310 composed of embedding nodes 312A-N (hereinafter "312", generally), where N is a positive integer greater than one. The embedding nodes 312 may be configured to accept the plurality of tokens generated from the text transcribed from the user utterances. For example and not by way of limitation, the embedding nodes 312D-H may be provided "Tell me my current location", as shown in FIG. 3.

Continuing to refer to FIG. 3, the embedding layer 310 of the machine learning model 300 may be further provided with a dialog context (e.g., embedding node 312B) in addition to the text transcribed from the user utterances (e.g., embedding nodes 312D-H). For example, the dialog context may be represented as a token and prepended to the plurality of input tokens provided to the embedding layer 310. In some embodiments, the dialog context may comprise a previous goal (and/or intent) of a previous utterance (e.g., voice command) of the user. For example, assuming a previous user utterance comprises "What is the weather in San Jose", and a current user utterance comprises "How about San Francisco", the machine learning model 300 may be unable to accurately identify the current user utterance based solely on the content of the utterance. However, in such a scenario, the dialog context may indicate to the machine learning model 300 that the current utterance relates to obtaining weather information for a city. Thus, the dialog context may allow the machine learning model 300 to accurately identify the current user utterance.

Alternatively or additionally, a separation token SEP (e.g., embedding node 312C) may separate the dialog context from the current user utterance input (e.g., embedding nodes 312D-H). Although FIG. 3 shows only one embedding node configured to receive the dialog context information, the embedding layer 310 may be further configured to accept additional dialog context information related to the user utterances. For example, the dialog context may further comprise previous user utterances, previous responses from the voice assistant, an indication as to whether the user is being prompted for input, previous state context of the machine learning model 300.

In some embodiments, the first embedding node 312A may be configured to receive a classification indication CLS. For example, the classification indication CLS may represent that sentence-level classification is to be performed by the machine learning model 300 on the input values provided to the remaining input nodes. Alternatively or additionally, the classification indication CLS may represent that token-level classification is to be performed. In some embodiments, a separator token SEP provided to the last embedding node 312N may indicate the end of the sentence to the machine learning model 300.

Figure 4:
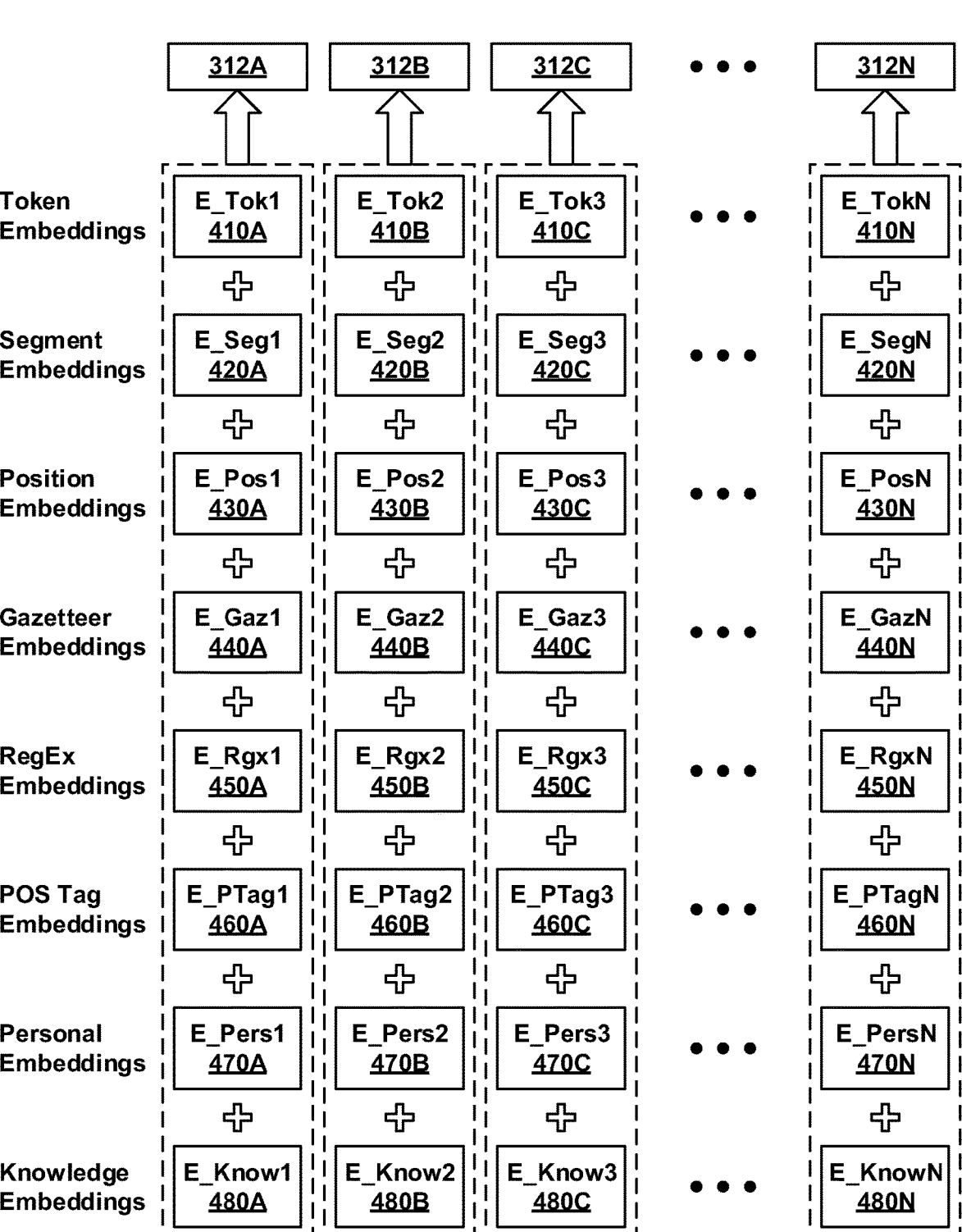
FIG. 4 depicts an example process of embedding context information, according to one or more example embodiments.

As described in further detail in reference to FIG. 4, the embedding nodes 312 may be configured to embed customized context information into the machine learning model 300. The customized context information may comprise information that may change frequently (e.g., lists of network device names, lists of contacts, and the like).

The output of the embedding nodes 312 (i.e., the embedding layer 310) may be connected, via weighted connections, to a first encoding layer 330A composed of encoding nodes 332AA-N (hereinafter "332A", generally), as represented by the arrows shown in FIG. 3. The training of the machine learning model 300 may comprise determining and/or adjusting (e.g., learning) the weights corresponding to each connection between two nodes of the machine learning model 300.

As shown in FIG. 3, each embedding node 312 of the embedding layer 310 may be connected, using weighted connections, to every encoding node 332A of the first encoding layer 330A.

The machine learning model 300 may comprise M encoding layers, where M is a positive integer greater than zero. That is, the machine learning model 300 may comprise encoding layers 330A-M (hereinafter "330", generally). Each encoding layer 330 may comprise N encoding nodes (e.g., 332AA-N, 332BA-N, . . . , 332MA-N) (hereinafter "332", generally). As shown in FIG. 3, the input of each encoding node 332 may be connected, using weighted connections, to the output of every encoding node 332 of a previous encoding layer 330, and the output of each encoding node 332 may be connected, using weighted connections, to the input of every encoding node 332 of a subsequent encoding layer 330.

The machine learning model 300 may comprise a BERT output layer 340 composed of BERT nodes 342A-N (hereinafter "342", generally). As shown in FIG. 3, the input of each BERT node 342 may be connected, using weighted connections, to the output of every encoding node 332 of the last encoding layer 330M (e.g., 332MA-N). The output of each BERT node 342 may be connected, using weighted connections, to at least one output head, such as, an intent classifier 352, a flag classifier 354, a goal classifier 356, and a sub-goal classifier 358. For example, as shown in FIG. 3, the output of a first BERT node 342A may be connected, via weighted connections, to the intent classifier 352 and to the flag classifier 354, and the outputs of the remaining BERT nodes 342 (e.g., 342B-N) may be connected, using weighted connections, to the goal classifier 356 and to the sub-goal classifier 358. However, in other embodiments, the connections between the BERT nodes 342 and the output heads 352-358 may differ from the connections shown in FIG. 3.

The intent classifier 352, the flag classifier 354, the goal classifier 356, and the sub-goal classifier 358 may be configured to simultaneously generate an intent prediction 362, flag predictions 364, goal predictions 366, and sub-goal predictions 368, respectively, that may identify probabilities of possible intent and/or slots of the text of the user utterance provided to the machine learning model 300.

In some embodiments, the machine learning model 300 may calculate an optimal intent label according to a weight function $W^i$ that is computed for every intent label, as shown in Equation 1.

$$y^i = \text{softmax}(W^i \cdot h_1 + b^i) \qquad \text{[Eq. 1]}$$

The intent i with a highest value of $y^i$ may be selected as the identified intent of the provided user utterance.

Alternatively or additionally, the machine learning model 300 may calculate an optimal slot label according to a weight function $W^s$ that is computed for every slot label, as shown in Equation 2.

$$y_n^s = \text{softmax}(W^s \cdot h_n + b^s), n \in \{1, \ldots, N\} \qquad \text{[Eq. 2]}$$

The slot s with a highest value of $$y_n^s$$

may be selected as the identified slot of token n of the provided user utterance.

In other optional or additional embodiments, the machine learning model 300 may determine the optimal intent and slot labels using dynamic programming-based optimization algorithms, such as, but not limited to, conditional random fields (CRFs), and the like.

During training time, the output (e.g., predictions) of the classifiers (e.g., 352-358, or output heads) may be compared with a ground truth (e.g., the known correct output given the input provided during the training session). The result of the comparison may be used to compute objective (e.g., loss) functions for adjusting the connection weights of the machine learning model 300. For example, a loss function for the intent prediction 362 may similar to Equation 3.

$$\text{Loss}_{intent} = -\sum_{n=1}^{intent\_categories} y_{intent_{pred}, intent_{label}} \log\left(P_{intent_{pred}, intent_{label}}\right) \qquad \text{[Eq. 3]}$$

For another example, a loss function for the flag predictions 364 may be similar to Equation 4.

$$\text{Loss}_{flag} = -\omega_{n,c}[p_c y_{n,c} \cdot \log \sigma(x_{n,c}) + (1 - y_{n,c}) \cdot \log(1 - \sigma(x_{n,c}))], \quad [\text{Eq. 4}]$$

$$\ell_c(x, y) = L_c = \{\ell_{1,c}, \dots, \ell_{N,c}\}^T$$

For another example, a loss function for the goal predictions 366 may be similar to Equation 5.

$$\text{Loss}_{goal} = \qquad\qquad [\text{Eq. 5}]$$

$$-\frac{1}{\text{tokens}} \sum_{i=1}^{\text{tokens}} \sum_{n=1}^{goal\_categories} y_{goal_{pred}, goal_{label}} \log \left(P_{goal_{pred}, goal_{label}}\right)$$

For another example, a loss function for the sub-goal predictions 368 may be similar to Equation 6.

$$\text{Loss}_{subgoal} = -\frac{1}{\text{tokens}} \cdot \qquad\qquad [\text{Eq. 6}]$$

$$\sum_{i=1}^{\text{tokens}} \sum_{n=1}^{subgoal\_categories} y_{subgoal_{pred}, subgoal_{label}} \log \left(P_{subgoal_{pred}, subgoal_{label}}\right)$$

By training the machine learning model 300 to simultaneously identify the intent and the slots, the machine learning model 300 may identify a set of intent and slots that optimizes the machine learning model 300 as a whole, rather than separately identifying each element of the set. For example, a full-weighted (e.g., total) loss function may be a linear combination of the individual loss functions (e.g., Eqs. 3-6). In some embodiments, the total loss function may be similar to Equation 7.

$$\text{Loss}_{total} = \text{coeff}_{intent} \cdot \text{Loss}_{intent} + \text{coeff}_{goal} \cdot \text{Loss}_{goal} + \text{coeff}_{subgoal} \quad [\text{Eq. 7}]$$

$$\cdot \text{Loss}_{subgoal} + \left(1 - \text{coeff}_{intent} - \text{coeff}_{goal} - \text{coeff}_{subgoal}\right) \cdot \text{Loss}_{flag}$$

The coefficients of Eq. 7 may be hyper-parameters that may be optimized during model training.

That is, the connection weights of the machine learning model 300 may be configured to optimize the output of the classifiers 352-358 together, as opposed to optimizing the output of only one of the classifiers 352-358. As a result, the machine learning model 300 may be trained to identify the intent and/or the slots of a voice command according to correlations between intents and slots and/or correlations between slots. That is, the training of the machine learning model 300 may leverage information regarding intent in the identification of slot information. Alternatively or additionally, the training of the machine learning model 300 may leverage slot information in the identification of the intent. For example, some slot values may not be compatible with certain intent values and/or some slot values may not be compatible with certain slot values. By training the machine learning model 300 to simultaneously identify the intent and the slots, these incompatibilities may be avoided.

Advantageously, when compared to related voice assistants that may implement four separate and independent machine learning models to separately (e.g., sequentially)

identify intent, flags, goals, and sub-goals, respectively, the machine learning model 300 may be configured to simultaneously identify intent and slots using a single machine learning model 300. Thus, according to one or more example embodiments, the machine learning model 300 may require less memory and/or computing resources to perform the identification of the intent and of the slots.

It may be understood that the exemplary Equations 1-7 described above are only one example of inference and loss equations that may be utilized. For example, other inference and loss equations may be utilized to optimize the output of the machine learning model 300 without departing from the scope described herein.

In some embodiments, sub-goals (e.g., nested goals) may comprise constraints regarding the alignment of their beginning and end positions with respect to the slots. For example, some sub-goals may require that the sub-goals be listed in a particular order. Consequently, the machine learning model 300 may perform post-processing on the identified slots (e.g., flags, goals, sub-goals) to ensure that the constraints regarding the identified slots are met. Table 1 shows an example of an algorithm that may be used to align the identified slots.

TABLE 1

| Algorithm 1 Role (Sub-Goal)—Slot Alignment |
|---|
| • Words: w₁, w₂, ..., w_W |

• Words: $w_1, w_2, \dots, w_W$
• Slots: $s_1, s_2, \dots, s_S$, where $1 \leq S \leq W$
• Slot Labels: $\ell_1, \ell_2, \dots, \ell_L$
• Slot = {begin, end, label}, where begin, end $\in$ {1, ...,W} are the span beginning and end indexes and begin $\leq$ end, and label is one of L labels
• Roles: $r_1, r_2, r_R$
• Index[i] = j, j $\in$ {1,..., S}, where j is the slot the word $w_i$ participates in
• Align roles with slots
  ○ $r_i$.begin = (Index[$r_i$.begin]).begin
  ○ $r_i$.end = (Index[$r_i$.end]).end As shown in Table 1, Algorithm 1 may ensure that the left boundary of a sub-goal is aligned with the left boundary of a corresponding slot, and that the right end of the sub-goal is aligned with the right boundary of a slot. That is, the Algorithm 1 may determine beginning and end positions of the sub-goals (nested goals) such that the span of the slot covers the span of all the sub-goals that correspond to that slot. It may be understood that other approaches may be possible to optimize a cost function over the constraints, for example, using dynamic programming (e.g., CRFs) and/or finding the maximum probability path. Algorithm 1 may also address additional constraints, such as, but not limited to, indicating which intents and slots may be incompatible, which slots cannot follow another particular slot, and the like (not shown).

In some embodiments, the slots may comprise an intent compatibility constraint. That is, one or more slots may not be compatibility with at least one intent label. In such embodiments, the machine learning model 300 may determine, according to the intent compatibility constraint, whether the intent prediction is compatible with the at least one of the flag prediction, the slot goal prediction, and the sub-goal prediction.

In some embodiments, the slots may comprise a slot goal order constraint. For example, one or more slots may require a particular order. In such embodiments, the machine learning model 300 may reorder, according to the slot goal order constraint, at least one slot.

FIG. 4 depicts an example process of embedding context information, according to one or more example embodiments. Referring to FIG. 4, a context information embedding process 400 that implements one or more aspects of the disclosure is illustrated. In some embodiments, at least a portion of the context information embedding process 400 may be implemented by the device 100 of FIG. 1. Alternatively or additionally, another computing device (e.g., server, laptop, smartphone, base station, UE, etc.) that comprises the voice command identifying component 180 may implement at least a portion of the context information embedding process 400.

As described in reference to FIG. 3, the embedding nodes 312 may be configured to embed customized context information into the machine learning model 300. The customized context information may be embedded into the machine learning model by creating an embedding space corresponding to each type of the customized context information. The embedding spaces may be created by mapping the corresponding customized context information into vector representations of the corresponding customized context information. The vector representations of each embedding space may have a same dimensionality as the embedding space of the plurality of tokens provided to the machine learning model 300 (e.g., token embeddings 410A-N; hereinafter "410", generally).

The customized context information may comprise information that may change frequently. As shown in FIG. 4, the customized context information may comprise at least one of segment embeddings 420A-N (hereinafter "420", generally), position embeddings 430A-N (hereinafter "430", generally), gazetteer embeddings 440A-N (hereinafter "440", generally), regular expression (RegEx) embeddings 450A-N (hereinafter "450", generally), part-of-speech (POS) embeddings 460A-N (hereinafter "460", generally), personal embeddings 470A-N (hereinafter "470", generally), and knowledge embeddings 480A-N (hereinafter "480", generally).

The multi-dimensional vectors comprising the embeddings 410-480 may be combined and provided to the embedding layer 310 (e.g., embedding nodes 312) of the machine learning model 300. In some embodiments, one or more of the embeddings 410-480 may be provided to the machine learning model 300 during a training time of the machine learning model 300. For example, as described in further detail in reference to FIG. 5, the gazetteer embeddings 440 may be provided during a training time of the machine learning model 300 to create a capsule comprising a customized version of the machine learning model 300. Alternatively or additionally, one or more embeddings 410-480 may be provided during an inference period (e.g., a runtime period) of the machine learning model 300. For example, a user of the voice assistant device may provide user-specific information (e.g., contact lists, addresses, and the like) with which the personal embeddings 470 may be created and provided to the machine learning model 300. As a result, the user of the voice assistant device may improve the accuracy of the voice assistant device when identifying the user-specific information by adding a user-specific vocabulary.

In some embodiments, domain specific language may be included into the machine learning model 300 by performing "continued training" of the machine learning model 300 using utterances from various topical libraries utilized by the voice assistant. Alternatively or additionally, the domain specific language data may be further augmented with real and/or synthetic data.

Figure 5:
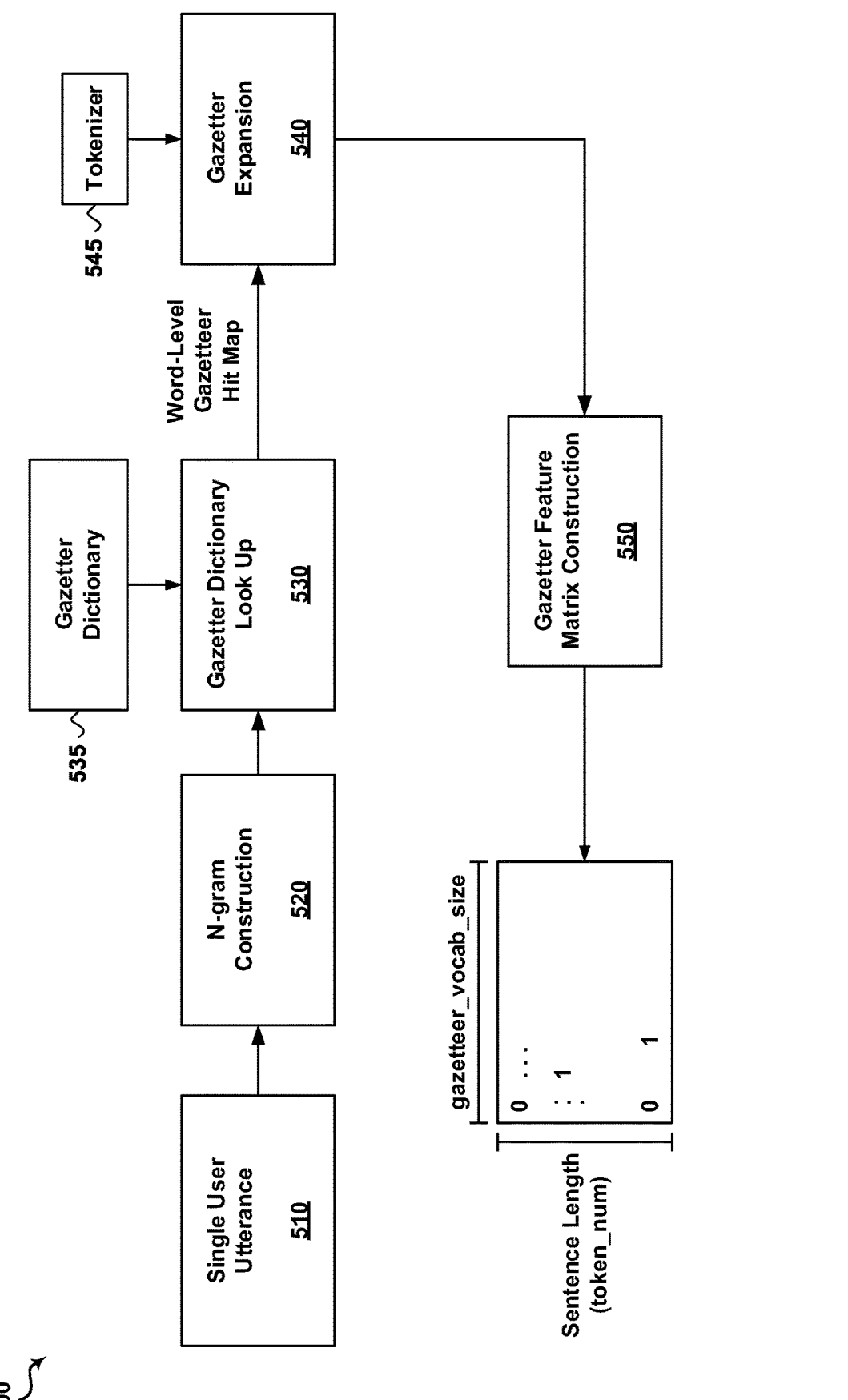
FIG. 5 illustrates an example process of generating gazetteer embeddings, according to one or more example embodiments.

FIG. 5 illustrates an example process of generating gazetteer embeddings, according to one or more example embodiments. Referring to FIG. 5, a gazetteer embedding generating process 500 that implements one or more aspects of the disclosure is illustrated. In some embodiments, at least a portion of the gazetteer embedding generating process 500 may be implemented by the device 100 of FIG. 1. Alternatively or additionally, another computing device (e.g., server, laptop, smartphone, base station, UE, etc.) that comprises the voice command identifying component 180 may implement at least a portion of the gazetteer embedding generating process 500.

At 510, the gazetteer embedding generating process 500 may obtain a user utterance. At 520, the gazetteer embedding generating process 500 may categorize, using an N-gram construction, the user utterance 510 into a plurality of word sequences. At 530, the gazetteer embedding generating process 500 may look up (e.g., search) each word sequence of the plurality of word sequences in a gazetteer dictionary 535 to obtain a word-level gazetteer hit map. At 540, the gazetteer embedding generating process 500 may expand, using a tokenizer 545, the word-level hit map into a token-level gazetteer hit map. At 550, the gazetteer embedding generating process 500 may apply the token-level gazetteer hit map to a gazetteer feature matrix to construct the capsule-specific vocabulary.

FIG. 6 depicts an example architecture of a machine learning model having a reduced model size, according to one or more example embodiments. Referring to FIG. 6, a reduced-size machine learning model 600 that implements one or more aspects of the disclosure is illustrated. In some embodiments, at least a portion of the reduced-size machine learning model 600 may be implemented by the device 100 of FIG. 1. Alternatively or additionally, another computing device (e.g., server, laptop, smartphone, base station, UE, etc.) that comprises the voice command identifying component 180 may implement at least a portion of the reduced-size machine learning model 600. The architecture of the reduced-size machine learning model 600 depicted in FIG. 6 is similar in many respects to the architecture of the machine learning model 300 described above with reference to FIG. 3 and may include additional features not mentioned above.

As shown in FIG. 6, the reduced-size machine learning model 600 may comprise an encoder 604 that comprises a stack of N layers, where N is a positive integer greater than 1 (e.g., 6). Each encoder layer may comprise a first sub-layer 606 and a second sub-layer 608. The first sub-layer 606 may comprise a masked multi-head self-attention function 610 and the second sub-layer 608 may comprise a fully-connected feed-forward network.

An attention function may refer to mapping a query and a set of key-value pairs to an output, where the query, the set of key-value pairs, and the output are vectors. The output may be computed as a weighted sum of the values, where the weight assigned to each value may be computed by a compatibility function of the query with the corresponding key. In particular, the masked multi-head self-attention function 610 may consist of several scaled dot-product attention layers running in parallel. Each scaled dot-product attention layer may perform the attention function on linearly projected queries, keys, and values.

The output of the encoder 604 may be used to generate the pooled sentence context embedding 642 and the token-level context embedding 644, as shown in FIG. 6. The pooled sentence context embedding 642 and the token-level context embedding 644 may be provided to the output heads (e.g., intent classifier 652, flag classifier 654, goal classifier 656, and sub-goal classifier 658) to create an intent prediction, flag predictions, goal predictions, and sub-goal predictions in a manner similar to the one described in reference to FIG. 3.

The intent classifier 652, the flag classifier 654, the goal classifier 656, and the sub-goal classifier 658 depicted in FIG. 6 may be similar in many respects to the intent classifier 352, the flag classifier 354, the goal classifier 356, and the sub-goal classifier 358 described above with reference to FIG. 3 and may include additional features not mentioned above.

In some embodiments, the reduced-size machine learning model 600 may be created, using a distillation approach, in which knowledge from a deep-learning machine learning model (e.g., the deep-learning machine learning model 300 of FIG. 3) is transferred to the reduced-size machine learning model 600 by matching the outputs, intermediate representations, and/or gradients of the two machine learning models. For example, a deep-learning machine learning model 300 with 768 dimensions, 12 layers, and 12 attention heads may be reduced to a reduced-size machine learning model 600 with 768 dimensions, 6 layers, and 12 attention heads. Such a reduction in size, may reduce the runtime latency and/or memory usage when compared to the deep-learning machine learning model 300.

Alternatively or additionally, as described above, the masked multi-head attention function 610 may be performed in parallel, which may further improve processing speeds during the training process and during inference (e.g., run-time) times.

Advantageously, the aspects presented herein may provide for traffic scenario clustering and load balancing by network devices of a wireless communication system. In some aspects, pairs of similar traffic scenario-specific load balancing policies may be identified using a greedy approach that may select an optimal option at each clustering iteration with a goal of obtaining a globally optimal solution as a result. In other aspects, a student policy is trained, using a knowledge distillation process, to mimic the behavior of the identified pair of load balancing policies. That is, the resulting load balancing policies may be optimized to perform load balancing on the corresponding traffic scenarios. Furthermore, the load balancing policies learned from the traffic scenarios are compared and merged, rather than comparing system transition dynamics (e.g., traffic scenarios) which may be difficult to model. As such, the aspects presented herein may allow for reduced overhead for managing load balancing policies and increased efficiency in the utilization of radio resources by the wireless communication system when compared to related wireless communication systems.

Figure 7:
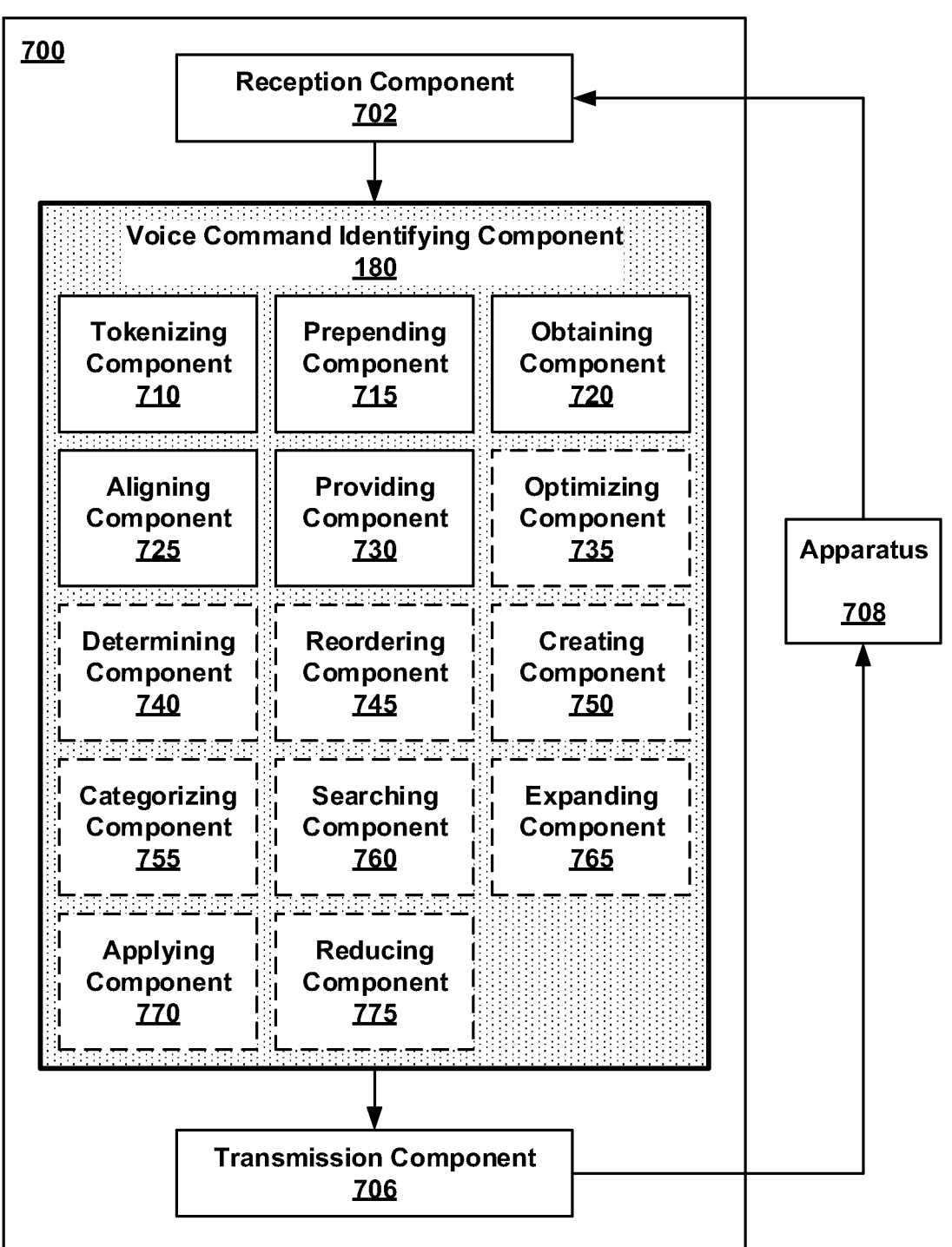
FIG. 7 illustrates a block diagram of an example apparatus for simultaneously identifying intent and slots in a voice assistant command, according to one or more example embodiments.

FIG. 7 illustrates a block diagram of an example apparatus 700 for simultaneously identifying intent and slots in a voice assistant command. The apparatus 700 may be a computing device (e.g., device 100 of FIG. 1) or a computing device may comprise the apparatus 700. In some embodiments, the apparatus 700 may comprise a reception component 702 configured to receive communications (e.g., wired, wireless) from another apparatus (e.g., apparatus 708), an voice command identifying component 180 configured to simultaneously identify intent and slots in a voice assistant command, and a transmission component 706 configured to transmit communications (e.g., wired, wireless) to another apparatus (e.g., apparatus 708). The components of the apparatus 700 may be in communication with one another (e.g., via one or more buses or electrical connections). As shown in FIG. 7, the apparatus 700 may be in communication with another apparatus 708 (such as a database, a server, or another computing device) using the reception component 702 and/or the transmission component 706.

In some embodiments, the apparatus 700 may be configured to perform one or more operations described herein in connection with FIGS. 1-6. Alternatively or additionally, the apparatus 700 may be configured to perform one or more processes described herein, such as method 800 of FIG. 8. In some embodiments, the apparatus 700 may comprise one or more components of the device 100 described above in connection with FIGS. 1-6.

The reception component 702 may receive communications, such as control information, data communications, or a combination thereof, from the apparatus 708 (e.g., a database, a server, or another computing device). The reception component 702 may provide received communications to one or more other components of the apparatus 700, such as the voice command identifying component 180. In some aspects, the reception component 702 may perform signal processing on the received communications, and may provide the processed signals to the one or more other components. In some embodiments, the reception component 702 may comprise one or more antennas, a receive processor, a controller/processor, a memory, or a combination thereof, of the device 100 described above in reference to FIG. 1.

The transmission component 706 may transmit communications, such as control information, data communications, or a combination thereof, to the apparatus 708 (e.g., a database, a server, or another computing device). In some embodiments, the voice command identifying component 180 may generate communications and may transmit the generated communications to the transmission component 706 for transmission to the apparatus 708. In some embodiments, the transmission component 706 may perform signal processing on the generated communications, and may transmit the processed signals to the apparatus 708. In other embodiments, the transmission component 706 may comprise one or more antennas, a transmit processor, a controller/processor, a memory, or a combination thereof, of the device 100 described above in reference to FIG. 1. In some embodiments, the transmission component 706 may be co-located with the reception component 702 such as in a transceiver and/or a transceiver component.

The voice command identifying component 180 may be configured to simultaneously identify intent and slots in a voice assistant command. In some embodiments, the voice command identifying component 180 may include a set of components, such as a tokenizing component 710 configured to tokenize a current utterance of a user of a device comprising the voice assistant command, a prepending component 715 configured to prepend the plurality of tokens with a previous utterance and a separation token, an obtaining component 720 configured to obtain one or more predictions for the voice assistant command from the prepended plurality of tokens, an aligning component 725 configured to align the at least one of the flag prediction, the goal prediction, and the sub-goal prediction, and a providing component 730 configured to provide the identified intent and the identified slots based on the intent prediction and the aligned at least one of the flag prediction, the goal prediction, and the sub-goal prediction.

Alternatively or additionally, the voice command identifying component 180 may further include an optimizing component 735 configured to optimize an overall loss function of the transformer-based machine learning model, a determining component 740 configured to determine the one or more predictions that optimize the overall loss function, a reordering component 745 configured to reorder the at least one of the flag prediction, the goal prediction, and the sub-goal prediction, a creating component 750 configured to create one or more embedding spaces, a categorizing component 755 configured to categorize a user utterance into a plurality of word sequences, a searching component 760 configured to search each word sequence of the plurality of word sequences in a dictionary, an expanding component 765 configured to expand the word-level hit map into a token-level hit map, an applying component 770 configured to apply the token-level hit map to a feature matrix, and a reducing component 775 configured to reduce a size of the transformer-based machine learning model.

In some embodiments, the set of components may be separate and distinct from the voice command identifying component 180. In other embodiments, one or more components of the set of components may include or may be implemented within a controller/processor (e.g., the processor 120), a memory (e.g., the memory 130), or a combination thereof, of the device 100 described above in reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 1.

Referring to FIG. 8, in operation, an apparatus 700 may perform a method 800 of simultaneously identifying intent and slots in a voice assistant command. The method 800 may be performed by the device 100 (which may include the memory 130 and which may be the entire device 100 and/or one or more components of the device 100, such as the processor 120, the input component 150, the output component 160, the communication interface 170, and/or the voice command identifying component 180). The method 800 may be performed by the voice command identifying component 180 in communication with the apparatus 708 (e.g., a database, a server, or another computing device).

At block 810 of FIG. 8, the method 800 may include tokenizing, into a plurality of tokens, a current utterance of a user of a device comprising the voice assistant command. For example, in an embodiment, the device 100, the voice command identifying component 180, and/or the tokenizing component 710 may be configured to or may comprise means for tokenizing, into a plurality of tokens, a current utterance of a user of a device comprising the voice assistant command.

For example, the tokenizing at block 810 may include transcribing the current user utterance into text, as described in further detail in reference to FIG. 3.

In some embodiments, the voice assistant command is in a natural language of the user.

Further, for example, the tokenizing at block 810 may be performed to pre-process the user utterance into a format that can be provided to the machine learning model 300.

At block 820 of FIG. 8, the method 800 may prepending the plurality of tokens with a previous utterance and a separation token. For example, in an embodiment, the device 100, the voice command identifying component 180, and/or the prepending component 715 may be configured to or may comprise means for prepending the plurality of tokens with a previous utterance and a separation token.

For example, the prepending at block 820 may include prepending additional dialog context information related to the user utterances, as described in reference to FIG. 3. For example, the dialog context may further comprise previous user utterances, previous responses from the voice assistant, an indication as to whether the user is being prompted for input, previous state context of the machine learning model 300.

Further, for example, the prepending at block 820 may be performed to allow the machine learning model 300 to accurately identify the current user utterance in scenarios in which the current user utterance lacks context.

At block 830 of FIG. 8, the method 800 may include obtaining, using a transformer-based machine learning model, one or more predictions for the voice assistant command from the prepended plurality of tokens, the one or more predictions comprising an intent prediction and at least one of a flag prediction, a goal prediction, and a sub-goal prediction. For example, in an embodiment, the device 100, the voice command identifying component 180, and/or the obtaining component 720 may be configured to or may comprise means for obtaining, using a transformer-based machine learning model, one or more predictions for the voice assistant command from the prepended plurality of tokens, the one or more predictions comprising an intent prediction and at least one of a flag prediction, a goal prediction, and a sub-goal prediction.

For example, the obtaining at block 530 may include obtaining, according to an intent loss function, one or more intent predictions from an intent classifier of the transformer-based machine learning model.

In some embodiments, the obtaining at block 530 may include obtaining, according to a flag loss function, one or more flag predictions from a flag classifier of the transformer-based machine learning model.

In other optional or additional embodiments, the obtaining at block 530 may include obtaining, according to a goal loss function, one or more goal predictions from a goal classifier of the transformer-based machine learning model.

In other optional or additional embodiments, the obtaining at block 530 may include obtaining, according to a sub-goal loss function, one or more sub-goal predictions from a sub-goal classifier transformer-based machine learning model.

In other optional or additional embodiments, the obtaining at block 530 may include optimizing an overall loss function of the transformer-based machine learning model, according to the intent loss function, the flag loss function, the goal loss function, and the sub-goal loss function. The intent loss function, the flag loss function, the goal loss function, and the sub-goal loss function may be simultaneously considered when optimizing the overall loss function.

In other optional or additional embodiments, the optimizing of the overall loss function may include determining the one or more predictions that optimize the overall loss function.

In other optional or additional embodiments, the optimizing of the overall loss function may include optimizing of the overall loss function comprises optimizing the overall loss function at a sentence level.

In other optional or additional embodiments, the obtaining at block 530 may include obtaining one or more types of context information, creating one or more embedding spaces corresponding to each type of the one or more types of context information, and obtaining, using the transformer-based machine learning model, the one or more predictions for the voice assistant command from the prepended plurality of tokens and the one or more embedding spaces. In such embodiments, each embedding space of the one or more embedding spaces may have a same dimension as the plurality of tokens.

In other optional or additional embodiments, the one or more types of context information include at least one of a capsule-specific vocabulary, segment information, position information, regular expression-based information, POS information, user-specific knowledge information, and knowledge graph information.

In other optional or additional embodiments, the obtaining at block 530 may include categorizing, using an N-gram construction, a user utterance into a plurality of word sequences, searching each word sequence of the plurality of word sequences in a dictionary to obtain a word-level hit map, expanding, using a tokenizer, the word-level hit map into a token-level hit map, and applying the token-level hit map to a feature matrix to obtain the capsule-specific vocabulary.

Further, for example, the obtaining at block 530 may be performed to obtain the intent and/or slot predictions from the machine learning model 300 based on the current user utterance.

At block 840 of FIG. 8, the method 800 may include aligning, according to one or more constraints, the at least one of the flag prediction, the goal prediction, and the sub-goal prediction. For example, in an embodiment, the device 100, the voice command identifying component 180, and/or the aligning component 725 may be configured to or may comprise means for aligning, according to one or more constraints, the at least one of the flag prediction, the goal prediction, and the sub-goal prediction.

For example, the aligning at block 840 may include addressing additional constraints, such as, but not limited to, indicating which intents and slots may be incompatible, which slots cannot follow another particular slot, and the like, as described in reference to FIG. 3.

In some embodiments, the sub-goal prediction may include a plurality of sub-goal predictions. In such embodiments, the aligning at block 840 may include, for each sub-goal prediction of the plurality of sub-goal predictions: aligning a left boundary of that sub-goal prediction with a left boundary of a corresponding slot, and aligning a right boundary of that sub-goal prediction with a right boundary of the corresponding slot.

In other optional or additional embodiments, the one or more constraints may include an intent compatibility constraint. In such embodiments, the aligning at block 840 may include determining, according to the intent compatibility constraint, whether the intent prediction is compatible with the at least one of the flag prediction, the goal prediction, and the sub-goal prediction.

In other optional or additional embodiments, the one or more constraints may include a goal order constraint. In such embodiments, the aligning at block 840 may include reordering, according to the goal order constraint, the at least one of the flag prediction, the goal prediction, and the sub-goal prediction.

Further, for example, the aligning at block 840 may be performed to ensure that the identified intent and/or slots are compatible with each other and are located in the proper order, such that the voice assistant may perform the identified intent and/or slots without encountering syntax errors on the command.

At block 850 of FIG. 8, the method 800 may include providing, to the device, the identified intent and the identified slots based on the intent prediction and the aligned at least one of the flag prediction, the goal prediction, and the sub-goal prediction, causing the device to perform the voice assistant command according to the identified intent and the identified slots. For example, in an embodiment, the device 100, the voice command identifying component 180, and/or the providing component 725 may be configured to or may comprise means for providing, to the device, the identified intent and the identified slots based on the intent prediction and the aligned at least one of the flag prediction, the goal prediction, and the sub-goal prediction, causing the device to perform the voice assistant command according to the identified intent and the identified slots.

In some embodiments, the method 800 may further include reducing, using a distillation process, a size of the transformer-based machine learning model, the size of the transformer-based machine learning model corresponding to a number of layers of the transformer-based machine learning model. For example, in an embodiment, the device 100, the voice command identifying component 180, and/or the reducing component 775 may be configured to or may comprise means for reducing, using a distillation process, a size of the transformer-based machine learning model, the size of the transformer-based machine learning model corresponding to a number of layers of the transformer-based machine learning model.

The following aspects are illustrative only and aspects thereof may be combined with aspects of other embodiments or teaching described herein, without limitation.

Aspect 1 is a method of simultaneously identifying intent and slots in a voice assistant command. The method includes tokenizing, into a plurality of tokens, a current utterance of a user of a device comprising the voice assistant command. The method further includes prepending the plurality of tokens with a previous utterance and a separation token. The method further includes obtaining, using a transformer-based machine learning model, one or more predictions for the voice assistant command from the prepended plurality of tokens. The one or more predictions include an intent prediction and at least one of a flag prediction, a goal prediction, and a sub-goal prediction. The method further includes aligning, according to one or more constraints, the at least one of the flag prediction, the goal prediction, and the sub-goal prediction. The method further includes providing, to the device, the identified intent and the identified slots based on the intent prediction and the aligned at least one of the flag prediction, the goal prediction, and the sub-goal prediction, causing the device to perform the voice assistant command according to the identified intent and the identified slots.

In Aspect 2, the method of Aspect 1 includes obtaining, according to an intent loss function, one or more intent predictions from an intent classifier of the transformer-based machine learning model. The method further includes obtaining, according to a flag loss function, one or more flag predictions from a flag classifier of the transformer-based machine learning model. The method further includes obtaining, according to a goal loss function, one or more goal predictions from a goal classifier of the transformer-based machine learning model. The method further includes obtaining, according to a sub-goal loss function, one or more sub-goal predictions from a sub-goal classifier transformer-based machine learning model. The method further includes optimizing an overall loss function of the transformer-based machine learning model, according to the intent loss function, the flag loss function, the goal loss function, and the sub-goal loss function. The intent loss function, the flag loss function, the goal loss function, and the sub-goal loss function are simultaneously considered when optimizing the overall loss function. The method further includes determining the one or more predictions that optimize the overall loss function.

In Aspect 3, the method of any of Aspects 1 or 2 includes optimizing the overall loss function at a sentence level.

In Aspect 4, the method of any of Aspects 1 to 3 includes optimizing the overall loss function at a token level.

In Aspect 5, the method of any of Aspects 1 to 4 includes the sub-goal prediction including a plurality of sub-goal predictions. The method further includes aligning a left boundary of that sub-goal prediction with a left boundary of a corresponding slot. The method further includes aligning a right boundary of that sub-goal prediction with a right boundary of the corresponding slot.

In Aspect 6, the method of any of Aspects 1 to 5 includes the one or more constraints including an intent compatibility constraint. The method further includes determining, according to the intent compatibility constraint, whether the intent prediction is compatible with the at least one of the flag prediction, the goal prediction, and the sub-goal prediction.

In Aspect 7, the method of any of Aspects 1 to 6 includes the one or more constraints including a goal order constraint. The method further includes reordering, according to the goal order constraint, the at least one of the flag prediction, the goal prediction, and the sub-goal prediction.

In Aspect 8, the method of any of Aspects 1 to 7 includes obtaining one or more types of context information. The method further includes creating one or more embedding spaces corresponding to each type of the one or more types of context information. Each embedding space of the one or more embedding spaces have a same dimension as the plurality of tokens. The method further includes obtaining, using the transformer-based machine learning model, the one or more predictions for the voice assistant command from the prepended plurality of tokens and the one or more embedding spaces.

In Aspect 9, the method of any of Aspects 1 to 8 includes the one or more types of context information including at least one of a capsule-specific vocabulary, segment information, position information, regular expression-based information, POS information, user-specific knowledge information, and knowledge graph information.

In Aspect 10, the method of any of Aspects 1 to 9 includes categorizing, using an N-gram construction, a user utterance into a plurality of word sequences. The method further includes searching each word sequence of the plurality of word sequences in a dictionary to obtain a word-level hit map. The method further includes expanding, using a tokenizer, the word-level hit map into a token-level hit map. The method further includes applying the token-level hit map to a feature matrix to obtain the capsule-specific vocabulary.

In Aspect 11, the method of any of Aspects 1 to 10 includes the voice assistant command being in a natural language of the user.

In Aspect 12, the method of any of Aspects 1 to 11 includes reducing, using a distillation process, a size of the transformer-based machine learning model, the size of the transformer-based machine learning model corresponding to a number of layers of the transformer-based machine learning model.

Aspect 13 is an apparatus for simultaneously identifying intent and slots in a voice assistant command including a memory storage storing computer-executable instructions, and a processor communicatively coupled to the memory storage, where the processor is configured to perform one or more of the methods of any of Aspects 1 to 12.

Aspect 14 is an apparatus for simultaneously identifying intent and slots in a voice assistant command including means for performing one or more of the methods of any of Aspects 1 to 12.

Aspect 15 is a non-transitory computer-readable storage medium storing computer-executable instructions for simultaneously identifying intent and slots in a voice assistant command by an electronic device, the computer-executable instructions including computer-executable instructions for performing one or more of the methods of any of Aspects 1 to 12.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1 and 7) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc., that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise. In addition, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

What is claimed is:

1. A method of simultaneously identifying intent and slots in a voice assistant command, comprising:

tokenizing, into a plurality of tokens, a current utterance of a user of a device comprising the voice assistant command;

prepending the plurality of tokens with a classification token, a previous utterance of the user, and a first separation token, and appending the plurality of tokens with a second separation token;

obtaining one or more types of context information comprising a previous intent of the previous utterance of the user;

creating one or more embedding spaces corresponding to each type of the one or more types of context information, each embedding space of the one or more embedding spaces having a same dimension as the plurality of tokens;

obtaining, using a transformer-based machine learning model, one or more predictions for the voice assistant command from the prepended plurality of tokens and the one or more embedding spaces, the one or more predictions comprising an intent prediction and at least one of a flag prediction, a goal prediction, and a sub-goal prediction;

aligning, according to one or more constraints, the at least one of the flag prediction, the goal prediction, and the sub-goal prediction; and providing, to the device, the identified intent and the identified slots based on the intent prediction and the aligned at least one of the flag prediction, the goal prediction, and the sub-goal prediction, causing the device to perform the voice assistant command according to the identified intent and the identified slots.

2. The method of claim 1, wherein the obtaining of the one or more predictions for the voice assistant command comprises:

obtaining, according to an intent loss function, one or more intent predictions from an intent classifier of the transformer-based machine learning model;

obtaining, according to a flag loss function, one or more flag predictions from a flag classifier of the transformer-based machine learning model;

obtaining, according to a goal loss function, one or more goal predictions from a goal classifier of the transformer-based machine learning model;

obtaining, according to a sub-goal loss function, one or more sub-goal predictions from a sub-goal classifier transformer-based machine learning model;

optimizing an overall loss function of the transformer-based machine learning model, according to the intent loss function, the flag loss function, the goal loss function, and the sub-goal loss function, the intent loss function, the flag loss function, the goal loss function, and the sub-goal loss function being simultaneously considered when optimizing the overall loss function; and determining the one or more predictions that optimize the overall loss function.

3. The method of claim 2, wherein the optimizing of the overall loss function comprises optimizing the overall loss function at a sentence level.

4. The method of claim 2, wherein the optimizing of the overall loss function comprises optimizing the overall loss function at a token level.

5. The method of claim 1, wherein the sub-goal prediction comprises a plurality of sub-goal predictions, and the aligning of the sub-goal prediction comprises, for each sub-goal prediction of the plurality of sub-goal predictions:

aligning a left boundary of that sub-goal prediction with a left boundary of a corresponding slot; and aligning a right boundary of that sub-goal prediction with a right boundary of the corresponding slot.

6. The method of claim 1, wherein the one or more constraints comprise an intent compatibility constraint, and the aligning of the at least one of the flag prediction, the goal prediction, and the sub-goal prediction comprises determining, according to the intent compatibility constraint, whether the intent prediction is compatible with the at least one of the flag prediction, the goal prediction, and the sub-goal prediction.

7. The method of claim 1, wherein the one or more constraints comprise a goal order constraint, and the aligning of the at least one of the flag prediction, the goal prediction, and the sub-goal prediction comprises reordering, according to the goal order constraint, the at least one of the flag prediction, the goal prediction, and the sub-goal prediction.

8. The method of claim 1, wherein the one or more types of context information comprise at least one of a capsule-specific vocabulary, segment information, position information, regular expression-based information, part-of-speech (POS) information, user-specific knowledge information, and knowledge graph information.

9. The method of claim 8, further comprising:

categorizing, using an N-gram construction, a user utterance into a plurality of word sequences;

searching each word sequence of the plurality of word sequences in a dictionary to obtain a word-level hit map;

expanding, using a tokenizer, the word-level hit map into a token-level hit map; and applying the token-level hit map to a feature matrix to obtain the capsule-specific vocabulary.

10. The method of claim 1, wherein the voice assistant command is in a natural language of the user.

11. The method of claim 1, further comprising:

reducing, using a distillation process, a size of the transformer-based machine learning model, the size of the transformer-based machine learning model corresponding to a number of layers of the transformer-based machine learning model.

12. An apparatus for simultaneously identifying intent and slots in a voice assistant command, comprising:

a memory storage storing computer-executable instructions; and a processor communicatively coupled to the memory storage, wherein the processor is configured to execute the computer-executable instructions and cause the apparatus to:

tokenize, into a plurality of tokens, a current utterance of a user of a device comprising the voice assistant command;

prepend the plurality of tokens with a classification token, a previous utterance of the user, and a first separation token, and append the plurality of tokens with a second separation token;

obtain one or more types of context information comprising a previous intent of the previous utterance of the user;

create one or more embedding spaces corresponding to each type of the one or more types of context information, each embedding space of the one or more embedding spaces having a same dimension as the plurality of tokens;

obtain, using a transformer-based machine learning model, one or more predictions for the voice assistant command from the prepended plurality of tokens and the one or more embedding spaces, the one or more predictions comprising an intent prediction and at least one of a flag prediction, a goal prediction, and a sub-goal prediction;

align, according to one or more constraints, the at least one of the flag prediction, the goal prediction, and the sub-goal prediction; and provide, to the device, the identified intent and the identified slots based on the intent prediction and the aligned at least one of the flag prediction, the goal prediction, and the sub-goal prediction, causing the device to perform the voice assistant command according to the identified intent and the identified slots.

13. The apparatus of claim 12, wherein the computer-executable instructions to obtain the one or more predictions for the voice assistant command further cause the apparatus to:

obtain, according to an intent loss function, one or more intent predictions from an intent classifier of the transformer-based machine learning model;

obtain, according to a flag loss function, one or more flag predictions from a flag classifier of the transformer-based machine learning model;

obtain, according to a goal loss function, one or more goal predictions from a goal classifier of the transformer-based machine learning model;

obtain, according to a sub-goal loss function, one or more sub-goal predictions from a sub-goal classifier transformer-based machine learning model;

optimize an overall loss function of the transformer-based machine learning model, according to the intent loss function, the flag loss function, the goal loss function, and the sub-goal loss function, the intent loss function, the flag loss function, the goal loss function, and the sub-goal loss function being simultaneously considered when optimizing the overall loss function; and determine the one or more predictions that optimize the overall loss function.

14. The apparatus of claim 12, wherein the sub-goal prediction comprises a plurality of sub-goal predictions, and the computer-executable instructions to align the sub-goal prediction further cause the apparatus, for each sub-goal prediction of the plurality of sub-goal predictions, to:

align a left boundary of that sub-goal prediction with a left boundary of a corresponding slot; and align a right boundary of that sub-goal prediction with a right boundary of the corresponding slot.

15. The apparatus of claim 12, wherein the one or more types of context information comprise at least one of a capsule-specific vocabulary, segment information, position information, regular expression-based information, part-of-speech (POS) information, user-specific knowledge information, and knowledge graph information, and wherein the computer-executable instructions further cause the apparatus to:

categorize, using an N-gram construction, a user utterance into a plurality of word sequences;

search each word sequence of the plurality of word sequences in a dictionary to obtain a word-level hit map;

expand, using a tokenizer, the word-level hit map into a token-level hit map; and apply the token-level hit map to a feature matrix to obtain the capsule-specific vocabulary.

16. The apparatus of claim 12, wherein the computer-executable instructions further cause the apparatus to:

reducing, using a distillation process, a size of the transformer-based machine learning model, the size of the transformer-based machine learning model corresponding to a number of layers of the transformer-based machine learning model.

17. A non-transitory computer-readable storage medium storing computer-executable instructions for simultaneously identifying intent and slots in a voice assistant command by an electronic device, the computer-executable instructions being configured, when executed by one or more processors of the electronic device, to cause the electronic device to:

tokenize, into a plurality of tokens, a current utterance of a user of a device comprising the voice assistant command;

prepend the plurality of tokens with a classification token, a previous utterance of the user, and a first separation token, and append the plurality of tokens with a second separation token;

obtain one or more types of context information comprising a previous intent of the previous utterance of the user;

create one or more embedding spaces corresponding to each type of the one or more types of context information, each embedding space of the one or more embedding spaces having a same dimension as the plurality of tokens;

obtain, using a transformer-based machine learning model, one or more predictions for the voice assistant command from the prepended plurality of tokens and the one or more embedding spaces, the one or more predictions comprising an intent prediction and at least one of a flag prediction, a goal prediction, and a sub-goal prediction;

align, according to one or more constraints, the at least one of the flag prediction, the goal prediction, and the sub-goal prediction; and provide, to the device, the identified intent and the identified slots based on the intent prediction and the aligned at least one of the flag prediction, the goal prediction, and the sub-goal prediction, causing the device to perform the voice assistant command according to the identified intent and the identified slots.

18. The non-transitory computer-readable storage medium of claim 17, wherein the computer-executable instructions to obtain the one or more predictions for the voice assistant command further cause the electronic device to:

obtain, according to an intent loss function, one or more intent predictions from an intent classifier of the transformer-based machine learning model;

obtain, according to a flag loss function, one or more flag predictions from a flag classifier of the transformer-based machine learning model;

obtain, according to a goal loss function, one or more goal predictions from a goal classifier of the transformer-based machine learning model;

obtain, according to a sub-goal loss function, one or more sub-goal predictions from a sub-goal classifier transformer-based machine learning model;

optimize an overall loss function of the transformer-based machine learning model, according to the intent loss function, the flag loss function, the goal loss function, and the sub-goal loss function, the intent loss function, the flag loss function, the goal loss function, and the sub-goal loss function being simultaneously considered when optimizing the overall loss function; and determine the one or more predictions that optimize the overall loss function.

* * * * *